(12) United States Patent
Kasza

(10) Patent No.: US 10,835,037 B2
(45) Date of Patent: *Nov. 17, 2020

(54) BOTTLE RACK

(71) Applicant: STACT Wine Displays Inc., Vancouver (CA)

(72) Inventor: Jamie Dennis Kasza, Vancouver (CA)

(73) Assignee: STACT WINE DISPLAYS INC., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/980,834

(22) Filed: May 16, 2018

(65) Prior Publication Data

US 2019/0133318 A1 May 9, 2019

Related U.S. Application Data

(63) Continuation of application No. 15/409,263, filed on Jan. 18, 2017, now Pat. No. 10,004,330.

(Continued)

(51) Int. Cl.
 *A47B 73/00* (2006.01)
 *F16B 9/02* (2006.01)
 (Continued)

(52) U.S. Cl.
 CPC ............ *A47B 73/00* (2013.01); *A47B 96/028* (2013.01); *F16B 9/026* (2013.01); *F16B 12/14* (2013.01);
 (Continued)

(58) Field of Classification Search
 CPC . A47B 73/00; A47B 96/028; A47B 2230/077; A47B 81/007; F16B 9/026;
 (Continued)

(56) References Cited

U.S. PATENT DOCUMENTS

| 49,633 A | 8/1865 | King |
| 278,200 A | 5/1883 | Tait |

(Continued)

FOREIGN PATENT DOCUMENTS

| CA | 1012095 | 6/1977 |
| CA | 2456638 | 8/2004 |

(Continued)

OTHER PUBLICATIONS

Extended European Search Report for European Patent Application No. 13172148.2 (dated Aug. 19, 2013).

(Continued)

*Primary Examiner* — Jonathan Liu
*Assistant Examiner* — Devin K Barnett
(74) *Attorney, Agent, or Firm* — Troutman Pepper Hamilton Sanders LLP (Rochester)

(57) ABSTRACT

A bottle rack includes a panel that has a front surface and an opposing back surface, and support bars cantilevered from the panel and extending from the front surface. Each of the support bars has a linear bottle supporting portion that is positioned, and that is at an acute angle, relative to the front surface such that at least two of the support bars can support a bottle while forcing the bottle against the front surface. The rack may be a "label forward" rack. Additionally, the various joints, grooves, and slots used to join the support bars to the panel may also be used to join any the support bars and panels of any suitable bottle rack.

8 Claims, 14 Drawing Sheets

Related U.S. Application Data

(60) Provisional application No. 62/438,964, filed on Dec. 23, 2016.

(51) Int. Cl.
  *A47B 96/02* (2006.01)
  *F16B 12/14* (2006.01)
  *F16B 9/00* (2006.01)

(52) U.S. Cl.
  CPC ....... *A47B 2230/0077* (2013.01); *F16B 9/054* (2018.08); *F16B 9/056* (2018.08)

(58) Field of Classification Search
  CPC .......... F16B 43/02; F16B 12/14; F16B 9/056; F16B 9/054; A47F 7/28
  USPC ..... 211/87.01, 190, 193, 86.01, 189, 74, 75; 248/220.31, 220.21, 221.11, 223.31, 248/223.41; 108/108, 158; 403/13, 300, 403/334, 230, 247, 258, 259, 260, 263; 411/538
  See application file for complete search history.

(56) References Cited

U.S. PATENT DOCUMENTS

| | | | |
|---|---|---|---|
| 583,727 | A | 6/1897 | Braun |
| 698,272 | A | 4/1902 | Glover |
| 799,783 | A | 9/1905 | Ette |
| 1,480,939 | A | 1/1924 | Hand |
| 1,617,003 | A | 2/1927 | Zeller |
| 1,735,710 | A | 11/1929 | Abrahamsen et al. |
| 1,797,296 | A | 3/1931 | Ray |
| 1,835,726 | A | 12/1931 | Thompson |
| 2,026,746 | A | 1/1936 | Moore |
| 2,051,408 | A | 8/1936 | Karst |
| 2,070,507 | A | 2/1937 | Bishop |
| 2,100,421 | A | 11/1937 | Wupper |
| 2,179,089 | A | 11/1939 | Hauf |
| 2,227,326 | A | 12/1940 | Shaw |
| 2,317,070 | A | 4/1943 | Le Tourneau |
| 2,366,676 | A | 1/1945 | Rosenthal |
| 2,527,796 | A | 10/1950 | Clute |
| 2,531,020 | A | 11/1950 | Bard |
| 2,562,327 | A | 7/1951 | Moore |
| 2,575,965 | A | 11/1951 | Malm |
| 2,774,477 | A | 12/1956 | Pollitz |
| 2,815,972 | A | 12/1957 | Lagervall |
| 2,879,900 | A | 3/1959 | Fox |
| 2,889,050 | A | 6/1959 | Modrey |
| D190,704 | S | 6/1961 | Cobbs |
| 3,181,701 | A | 5/1965 | Manny |
| 3,186,558 | A | 6/1965 | Horstmann |
| 3,200,960 | A | 8/1965 | Banse |
| 3,204,867 | A | 9/1965 | Wahlbom |
| 3,244,390 | A | 4/1966 | Kerr |
| 3,252,678 | A | 5/1966 | Myers et al. |
| 3,255,987 | A | 6/1966 | Gatch |
| 3,272,468 | A | 9/1966 | Wittrock |
| 3,279,620 | A | 10/1966 | Nesbitt |
| 3,336,758 | A | 8/1967 | Williams |
| 3,377,807 | A | 4/1968 | Vincent |
| D211,635 | S | 7/1968 | Holm |
| 3,422,721 | A | 1/1969 | Yonkers |
| 3,469,869 | A | 9/1969 | Ramakers |
| 3,519,292 | A | 7/1970 | Krikorian |
| 3,541,798 | A | 11/1970 | Schnabel, Jr. |
| 3,606,023 | A | 9/1971 | Edmunds |
| 3,638,814 | A | 2/1972 | Lowery |
| 3,653,697 | A | 4/1972 | Ernst |
| D226,051 | S | 1/1973 | Fujinami |
| 3,731,956 | A | 5/1973 | Hanley |
| 3,740,692 | A | 6/1973 | Filhaber |
| 3,747,965 | A | 7/1973 | Wing |
| 3,753,354 | A | 8/1973 | Bauer |
| 3,799,357 | A | 3/1974 | Govang |
| D232,284 | S | 8/1974 | Shuck |
| 3,836,007 | A | 9/1974 | Rosenwein |
| 3,897,724 | A | 8/1975 | Mcdonald |
| D236,565 | S * | 9/1975 | Fuller ............................ D7/708 |
| 3,924,750 | A | 12/1975 | Dunchock |
| D238,735 | S | 2/1976 | Trieschmann |
| 3,938,667 | A | 2/1976 | Buckland |
| D243,804 | S | 3/1977 | Underwood et al. |
| 4,019,638 | A | 4/1977 | Miller |
| 4,022,327 | A | 5/1977 | Anderson |
| 4,063,836 | A | 12/1977 | Militano |
| 4,082,389 | A | 4/1978 | Stewart |
| 4,094,415 | A | 6/1978 | Larson |
| 4,193,586 | A | 3/1980 | Guenther |
| D255,405 | S | 6/1980 | DeVillers |
| 4,223,862 | A | 9/1980 | Doughty |
| 4,264,230 | A | 4/1981 | Vanderminden |
| 4,282,977 | A | 8/1981 | Di Lorenzo |
| D260,463 | S | 9/1981 | Imus |
| D262,334 | S | 12/1981 | Clarke, Jr. et al. |
| 4,319,730 | A | 3/1982 | Thalenford |
| 4,340,317 | A | 7/1982 | Heitmann et al. |
| 4,358,214 | A | 11/1982 | Shull |
| 4,386,870 | A | 6/1983 | Baroody |
| 4,420,087 | A | 12/1983 | Johns |
| 4,431,332 | A | 2/1984 | Dieges |
| 4,482,065 | A | 11/1984 | Altemose |
| 4,485,929 | A | 12/1984 | Betts, Sr. |
| 4,514,107 | A | 4/1985 | Moreno |
| D284,720 | S | 7/1986 | Watson |
| 4,601,621 | A | 7/1986 | Permoda |
| D289,716 | S | 5/1987 | Boland |
| D291,031 | S | 7/1987 | Luongo |
| 4,695,183 | A | 9/1987 | Greenberg |
| 4,711,594 | A | 12/1987 | Agee |
| D295,128 | S | 4/1988 | Gentile |
| 4,805,783 | A | 2/1989 | Mayer |
| 4,836,574 | A | 6/1989 | Ingalls |
| D306,385 | S | 3/1990 | Alexander et al. |
| 4,944,415 | A | 7/1990 | Orbach |
| 4,981,388 | A | 1/1991 | Becken et al. |
| 4,993,865 | A | 2/1991 | Nagashima |
| 5,025,936 | A | 6/1991 | Lamoureaux |
| 5,037,390 | A | 8/1991 | Raines |
| D320,325 | S | 10/1991 | Barfield |
| 5,067,846 | A | 11/1991 | Staniszewski |
| 5,094,564 | A | 3/1992 | Tedrick |
| 5,097,966 | A | 3/1992 | Miller |
| 5,116,007 | A | 5/1992 | Von Gunton et al. |
| 5,163,567 | A | 11/1992 | Betts, Sr. |
| D332,018 | S | 12/1992 | De Pas et al. |
| 5,169,009 | A | 12/1992 | Bomze |
| D333,559 | S | 3/1993 | Rowley |
| 5,190,393 | A | 3/1993 | Svensson |
| 5,210,898 | A | 5/1993 | Carey |
| 5,215,413 | A | 6/1993 | Nance |
| 5,242,239 | A | 9/1993 | Hosokawa |
| 5,279,232 | A | 1/1994 | Gollick |
| 5,306,093 | A | 4/1994 | Elbert |
| D348,182 | S | 6/1994 | Young |
| D348,806 | S | 7/1994 | Young |
| 5,326,206 | A | 7/1994 | Moore |
| D367,592 | S * | 3/1996 | Newport ..................... D6/682.6 |
| 5,499,724 | A | 3/1996 | Hickman |
| 5,503,276 | A | 4/1996 | Pierce |
| 5,607,070 | A | 3/1997 | Hellyer |
| 5,653,349 | A | 8/1997 | Dana et al. |
| D383,607 | S | 9/1997 | Whitlock |
| 5,678,794 | A | 10/1997 | Kump |
| 5,711,436 | A | 1/1998 | Moeller et al. |
| 5,727,698 | A | 3/1998 | Lai |
| 5,785,187 | A | 7/1998 | Lipman et al. |
| D396,800 | S | 8/1998 | Robert |
| 5,813,550 | A | 9/1998 | Sheehan et al. |
| 5,855,347 | A | 1/1999 | Hollingsworth et al. |
| D406,217 | S | 3/1999 | Campbell |
| 5,906,466 | A | 5/1999 | Eandi |
| 5,918,750 | A | 7/1999 | Jackson |

(56) References Cited

U.S. PATENT DOCUMENTS

| | | | |
|---|---|---|---|
| 5,944,203 | A | 8/1999 | Vlah et al. |
| 6,116,435 | A | 9/2000 | Young |
| 6,119,875 | A | 9/2000 | Smith |
| 6,126,022 | A | 10/2000 | Merkel |
| 6,161,707 | A | 12/2000 | Lin |
| 6,173,845 | B1 | 1/2001 | Higgins et al. |
| 6,199,705 | B1 | 3/2001 | Portner et al. |
| 6,336,298 | B1 | 1/2002 | Chou |
| 6,355,038 | B1 | 3/2002 | Pisharodi |
| 6,361,129 | B1 | 3/2002 | Borgen |
| D460,295 | S | 7/2002 | Fissell et al. |
| D460,902 | S | 7/2002 | Battle |
| 6,443,316 | B1 | 9/2002 | Mao |
| 6,464,691 | B1 | 10/2002 | Castaneda |
| 6,502,711 | B1 | 1/2003 | McRae |
| 6,561,474 | B1 | 5/2003 | Walter et al. |
| 6,575,312 | B2 | 6/2003 | Santa Cruz |
| 6,589,277 | B1 | 7/2003 | Fabiani |
| 6,644,483 | B1 | 11/2003 | Lai |
| 6,675,978 | B2 | 1/2004 | Shea |
| 6,695,154 | B2 | 2/2004 | Jacobs |
| 6,711,871 | B2 | 3/2004 | Beirise et al. |
| 6,729,481 | B1 | 5/2004 | O'Brien |
| 6,763,956 | B2 | 7/2004 | Woods |
| 6,786,337 | B2 | 9/2004 | Klein |
| D497,526 | S | 10/2004 | Sanders et al. |
| 6,808,147 | B2 | 10/2004 | Brannen et al. |
| D509,108 | S | 9/2005 | Rosenberg et al. |
| 6,945,414 | B1 | 9/2005 | Stevens et al. |
| 6,991,117 | B2 | 1/2006 | McCain |
| 7,040,835 | B2 | 5/2006 | Sun |
| D539,563 | S | 4/2007 | Grosfillex |
| 7,198,159 | B2 | 4/2007 | Fischer |
| D543,078 | S | 5/2007 | Davalos |
| 7,270,242 | B2 | 9/2007 | Liu |
| D554,188 | S | 10/2007 | Bonaventura |
| 7,284,671 | B1 | 10/2007 | Doscher |
| 7,284,734 | B2 | 10/2007 | Hamerski |
| D566,490 | S | 4/2008 | Frentzel |
| 7,377,397 | B2 | 5/2008 | Lee et al. |
| 7,392,912 | B2 | 7/2008 | Zandt |
| 7,448,820 | B1 | 11/2008 | Faber |
| 7,517,425 | B2 | 4/2009 | Schroeder et al. |
| 7,673,761 | B2 | 3/2010 | Lee et al. |
| D618,524 | S | 6/2010 | Nesil et al. |
| 7,806,268 | B2 | 10/2010 | Angelocci |
| 7,850,017 | B2 | 12/2010 | McCain |
| 7,861,986 | B2 | 1/2011 | Cline |
| 7,878,340 | B1 | 2/2011 | Olsen |
| 7,882,967 | B2 | 2/2011 | Hynes |
| D634,992 | S | 3/2011 | McNamee |
| 7,942,747 | B2 * | 5/2011 | Cole ............... A47B 47/00 211/100 |
| D655,986 | S | 3/2012 | Schneider |
| 8,231,015 | B2 | 7/2012 | McCain |
| 8,272,506 | B1 | 9/2012 | Flannery |
| 8,336,862 | B2 | 12/2012 | Priefert |
| D678,011 | S | 3/2013 | Wylie et al. |
| 8,573,548 | B2 | 11/2013 | Kuhn et al. |
| 8,607,994 | B1 | 12/2013 | Schneider |
| 8,668,049 | B2 | 3/2014 | Leng |
| 8,684,194 | B2 | 4/2014 | McCain |
| 8,740,534 | B2 | 6/2014 | Shawe |
| D708,494 | S * | 7/2014 | Carpenter .................. D7/701 |
| 8,807,896 | B2 | 8/2014 | McKinlay |
| D714,591 | S | 10/2014 | Chen |
| D714,592 | S | 10/2014 | Chen |
| D715,103 | S | 10/2014 | Chen |
| D715,104 | S | 10/2014 | Chen |
| D715,105 | S | 10/2014 | Chen |
| D731,866 | S | 6/2015 | Paulick |
| 9,060,603 | B1 | 6/2015 | Christie |
| 9,064,687 | B2 | 6/2015 | Rebstock |
| D734,977 | S | 7/2015 | Dietz |
| D735,540 | S | 8/2015 | Carpenter |
| D739,189 | S | 9/2015 | Carpenter |
| D739,190 | S | 9/2015 | Kasza |
| 9,149,115 | B2 | 10/2015 | Kasza et al. |
| D747,155 | S | 1/2016 | Goodman |
| D751,371 | S | 3/2016 | Pan |
| D751,871 | S | 3/2016 | Polley et al. |
| 9,289,062 | B1 | 3/2016 | Posa |
| D756,723 | S | 5/2016 | Cash |
| D758,754 | S | 6/2016 | Appleby |
| 9,364,085 | B2 | 6/2016 | McCain |
| D766,051 | S | 9/2016 | LaRiviere |
| D766,052 | S | 9/2016 | Guindi |
| D776,956 | S | 1/2017 | Ma |
| 9,565,933 | B2 | 2/2017 | Kasza |
| 9,629,485 | B2 | 4/2017 | Florek |
| D785,418 | S | 5/2017 | Carpenter |
| D789,164 | S | 6/2017 | Peterson |
| 9,949,563 | B2 | 4/2018 | Kasza et al. |
| 10,004,330 | B1 | 6/2018 | Kasza |
| D821,831 | S | 7/2018 | Kasza |
| D834,900 | S | 12/2018 | Kasza |
| D838,561 | S | 1/2019 | Sill |
| D848,802 | S | 5/2019 | Kasza |
| 10,441,075 | B2 | 10/2019 | Kasza et al. |
| D878,828 | S | 3/2020 | Kasza |
| 2001/0013567 | A1 | 8/2001 | Valiulis |
| 2003/0057336 | A1 | 3/2003 | Hochman |
| 2004/0069730 | A1 | 4/2004 | Woods |
| 2004/0104187 | A1 | 6/2004 | McCain |
| 2004/0144740 | A1 * | 7/2004 | Przygoda ............... A47B 73/00 211/74 |
| 2005/0072746 | A1 | 4/2005 | O'Brien |
| 2006/0275098 | A1 | 12/2006 | Kramer |
| 2007/0039907 | A1 | 2/2007 | Zandt |
| 2007/0068887 | A1 | 3/2007 | Nawrocki |
| 2007/0094985 | A1 | 5/2007 | Grafenauer |
| 2007/0158284 | A1 | 7/2007 | Felder |
| 2008/0000861 | A1 | 1/2008 | Mullerleile |
| 2008/0054142 | A1 | 3/2008 | Deland |
| 2009/0071920 | A1 | 3/2009 | Bassetti |
| 2009/0152219 | A1 | 6/2009 | Brida |
| 2009/0152221 | A1 | 6/2009 | Hynes |
| 2009/0286611 | A1 | 11/2009 | Beach et al. |
| 2010/0006523 | A1 | 1/2010 | Hogeback |
| 2010/0051769 | A1 | 3/2010 | Tyson |
| 2011/0132853 | A1 | 6/2011 | Drobot et al. |
| 2011/0309220 | A1 | 12/2011 | Collini |
| 2012/0082528 | A1 | 4/2012 | Wang |
| 2012/0085721 | A1 | 4/2012 | Drobot et al. |
| 2013/0334155 | A1 | 12/2013 | Kasza et al. |
| 2014/0339182 | A1 | 11/2014 | Koder et al. |
| 2015/0060380 | A1 | 3/2015 | Maurer |
| 2016/0029790 | A1 | 2/2016 | Carpenter |
| 2016/0190838 | A1 * | 6/2016 | Webb ............... H02J 7/0044 320/115 |
| 2016/0331131 | A1 * | 11/2016 | Ghaeni ............... A47F 5/0823 |
| 2017/0105522 | A1 | 4/2017 | Kasza et al. |
| 2018/0146781 | A1 | 5/2018 | Kasza et al. |
| 2019/0021492 | A1 | 1/2019 | Sill |

FOREIGN PATENT DOCUMENTS

| | | |
|---|---|---|
| CA | 2677021 | 2/2010 |
| CA | 2743948 | 5/2010 |
| CN | 303752353 | 7/2016 |
| DE | 3015594 A1 | 12/1981 |
| DE | 20309209 | 8/2003 |
| EP | 1389437 | 2/2004 |
| FR | 0652290001 | 1/2007 |
| GB | 261537 | 11/1926 |
| GB | 1202519 | 8/1970 |
| GB | 2189387 A | 10/1987 |
| GB | 2242352 A | 10/1991 |

(56) References Cited

FOREIGN PATENT DOCUMENTS

| NL | 1021103 C1 | 1/2004 |
|---|---|---|
| WO | WO 2014032158 A1 | 3/2014 |

OTHER PUBLICATIONS

Vin De Garde, "Beta Bloc—Single Bottle," 3D Warehouse SketchUp, http://sketchup.google.com/3dwarehouse/details?mid=950db41b6d3bd0edc72a6080af74e2bc, 1 page (Nov. 30, 2012).
Billy Carpenter, Twitter Post, https://twitter.com/moderncellars/status/252140684579061760, 1 page (Sep. 29, 2012).
Billy Carpenter, Twitter Post, https://twitter.com/moderncellars/status/254266152501526529, 1 page (Oct. 5, 2012).
Vin De Garde, 2013 Catalog, "Vin De Garde 2013, Modern Wine Cellars," pp. 1-29 (2013).
Amazon.fr, Product Description, Blomus Pilare /68486 Casier a vin Pour 12 Bouteilles [Blomus Pilare /68486 Wine Rack for 12 Bottles], http://www.amazon.fr/blomus-pilare-68486-Casier-bouteilles/dp/B000BKBJWC/ref=sr_1_1?ie=UTF8&qid=1421968472&sr=8-1&keywords=Blomus+Pilare, date first available at Amazon.fr Aug. 8, 2007 (accessed Jan. 22, 2015)
Hayneedle.com, Product Description, Blomus Pilare Wine Rack—Choose 9 or 12 Bottle Rack, review 1 dated Nov. 9, 2006, http://www.hayneedle.com/product/pilarewinerack.cfm (accessed Jan. 10, 2015).
Amazon.com, Product Description, Blomus Wine Bottle Storage, Holds 12 Bottles, review by Brian Go dated Aug. 2, 2011, http://www.amazon.com/Blomus-Bottle-Storage-Holds-Bottles/dp/B000BKBJWC (accessed Jan. 10, 2015).
Walmart.com, Product Description, Blomus Pilare Wine Rack—Choose 9 or 12 Bottle Rack, review by Carol-Simplify dated Mar. 26, 2008, http://www.walmart.com/ip/blomus-Pilare-Wine-Rack-Choose-9-or-12-Bottle-Rack/17361365, (accessed Jan. 10, 2015)
Amazon.de, Product Description, Blomus 68486 PILARE Weinregal, für 12 Flaschen [Blomus 68486 PILARE Wine Rack for 12 Bottles], http://www.amazon.de/Blomus-68486-PILARE-Weinregal-Flaschen/dp/B000BKBJWC, date first available at Amazon.de Sep. 22, 2005 (accessed Jan. 22, 2015).
Stact.com, "Turn Your Wine Into Art," http://www.getstact.com/ (archived Jul. 29, 2012).
Rosendahl, Spec Sheet, Wine Rack, https://web.archive.org/web/20050304022515/http://www.unicahome.com/products/pdf/9223/rosendahl_wine_rack.pdf (Feb. 8, 2005).
International Search Report for PCT/CA2013/000259, published as WO 2014/032158 (dated Dec. 23, 2013).
Vin De Garde Cellar Systems, Modern Wine Cellars Catalog 2011 (2011).
Genuwine Cellars, Label Link (retrieved from http://www.genuwinecellars.com/metal-series/label-link/on Jan. 25, 2013).
Genuwine Cellars, PEG System (retrieved from http://www.genuwinecellars.com/metal-series/peg-system/ on Jan. 25, 2013).
Genuwine Cellars, Metal Series (retrieved from http://www.genuwinecellars.com/metal-series/on Feb. 21, 2013).
Houzz Inc., Bachus Bottle Rack—modern—wine racks—by Made in Design, 2013 (retrieved from http://www.houzz.com/photos/151858/Bachus-Bottle-Rack-modern-wine-racks- on Jul. 18, 2013).
Houzz Inc., Live-Edge Solid Walnut 6-Bottle Wine Rack—eclectic—wine racks—by Etsy, 2013 (retrieved from http:// www.houzz.com/photos/2739502/Live-Edge-Solid-Walnut-6-Bottle-Wine-Rack-eclectic-wine-racks- on Jul. 18, 2013).
Houzz Inc., Wood & Metal Industrial Wine Rack—contemporary—wine—racks by World Market, 2013 (retrieved from http://www.houzz. com/photos/1548374/Wood---Metal-Industrial-Wine-Rack-contemporary-wine-racks- on Jul. 18, 2013).
STACT Wine Displays Inc., STACT revolutionary wine rack, 2013 (retrieved from http://www.getstact.com/ collections/wine-rack-revolutionized on Jul. 18, 2013).
Kickstarter.com, "STACT Modular Wine Wall: Wine Storage Beautified," launched Jul. 26, 2012, http://www.kickstarter.com/projects/stact/stact-modular-wine-wall-wine-storage-beautified (archived Jul. 28, 2012).
Marketwired.com, "Wine Storage Beautified: Canada's STACT Modular Wine Wall System Launches Globally through Kickstarter," http://www.marketwired.com/press-release/wine-storage-beautified-canadas-stact-modular-wine-wall-system-launches-globally-through-1684078.htm (Jul. 26, 2012).
Gillian Shaw, "Vancouver Wine Connoisseur Launches Successful Kickstarter Project to Fund the Perfect Wine Rack," Vancouver Sun, Digital Life, http://blogs.vancouversun.com/2012/07/28/vancouver-wine-connoisseur-launches-successful-kickstarter-project-to-fund-the-perfect-wine-rack/ (Jul. 28, 2012).
Kim Hart Macneill, "A New Way to Kickstart a Business," Profitguide. com, http://www.profitguide.com/startup/best-practices/mass-appeals-40210 (Sep. 5, 2012).
Uncrate.com, "Stact Modular Wine Wall," http://uncrate.com/stuff/stact-modular-wine-wall/ (archived Jul. 30, 2012).
billwang.net, Design Online, [Billwang Industrial Design Forum > Industrial Design Zone > Design Resources > Design Resources Digest > Nordic windows, some household items map , p. 25 Update (Jul. 5 )], Posted on Dec. 11, 2006 , 17:04, http://bbs.billwang.net/post5298125-187/ (accessed Jan. 22, 2015).
Aronson, Steven M. L. et al., "An Ocean of Art William I. Koch's Stellar Collection in Palm Beach," *Architectural Digest* (Mar. 2002).
Sothebys.com, "First Look: Wines from the Cellar of William I. Kock," Video Screenshot at 0:37, http://www.sothebys.com/content/sothebys/en/news-video/videos/2016/03/wines-from-the-cellar-of-william-i-koch.html.
Youtube.com, "The Wine Cellar of William I. Koch: The Collector," Video Screenshot at 0:24 and 0:48, https://www.youtube.com/watch?v=GX88VKyJ7h0.
Isaac, Ryan "Oil, Water and Wine Bill Koch mixes it up, for profit and pleasure," *Wine Spectator* (Nov. 2006).
Worldmarket.com, Product Description, 30-Bottle Verona Wine Rack, http://www.worldmarket.com/product/30-bottle+verona+wine+rack.do?&from=fn (earliest date online Jul. 27, 2015; accessed Feb. 28, 2017).
Dullred.com, "Nice Rectangle Shape Kitchen Wine Racks Come With Brown Wooden Modular Shape Wine Rack And Brown Wooden Wire Glass Cabinet and Double Door Cabinet," http://www.dullred.com/wonderful-design-ideas-of-kitchen-wine-racks/nice-rectangle-shape-kitchen-wine-racks-brown-wooden-modular-shape-winde-rack-brown-wooden-winde-glass-cabinet-double-door-cabinet/ (earliest date online Nov. 14, 2015; accessed Feb. 28, 2017).
Core77.com, "Designing for Wine Storage," http://www.core77.com/posts/26960/Designing-for-Wine-Storage (earliest date online May 29, 2014; accessed Feb. 28, 2017).
Vigilantinc.com, "Vintage View Metal Wine Racks," https://vigilantinc.com/wine-racks/metal-wine-racks.php (earliest date online 2015; accessed Feb. 28, 2017).
Indiamart.com, "Wall Mount Bottle Rack," https://www.indiamart.com/proddetail/wall-mount-wine-bottle-rack-14778959562.html (retrieved by the USPTO on Nov. 28, 2017).
Design U.S. Appl. No. 29/589,781, filed Jan. 4, 2017, First Named Inventor: Jamie Dennis Kasza.
Design U.S. Appl. No. 29/609,604, filed Jul. 3, 2017, First Named Inventor: Jamie Dennis Kasza.
Design U.S. Appl. No. 29/625,830, filed Nov. 13, 2017, First Named Inventor: Jamie Dennis Kasza.
Design U.S. Appl. No. 29/637,470, filed Feb. 19, 2018, First Named Inventor: Jamie Dennis Kasza.
Design U.S. Appl. No. 29/647,826, filed May 16, 2018, First Named Inventor: Jamie Dennis Kasza.
Office Action in European Patent Application No. EP13172148.2 (dated Aug. 14, 2018).
Homedepot.com, Product Description, Anchor Hocking Bamboo Wine Rack with Espresso Accents, https://www.homedepot.com/p/

(56) References Cited

OTHER PUBLICATIONS

Anchor-Hocking-Bamboo-Wine-Rack-with-Espresso-Accents-98617AH/205201216 (accessed Jun. 30, 2018).

* cited by examiner

BOTTLE RACK

CROSS-REFERENCE TO RELATED APPLICATION

This application is a continuation application of U.S. patent application Ser. No. 15/409,263, filed Jan. 18, 2017, which claims priority to U.S. Provisional Patent Application Ser. No. 62/438,964, filed on Dec. 23, 2016, each of which is hereby incorporated by reference in its entirety.

TECHNICAL FIELD

The present disclosure is directed at a bottle rack.

BACKGROUND

Wine bottles are commonly publicly displayed to permit persons to easily access wine and for decorative purposes. One way in which to display wine bottles is to publicly store them using a bottle rack.

Various types of bottle racks are known in the art. One type of bottle rack is a "label forward" bottle rack, in which bottles are stored such that their labels are generally outwardly facing.

SUMMARY

According to a first aspect, there is provided a bottle rack comprising a panel and support bars. The panel comprises a front surface and an opposing back surface. The support bars are cantilevered from the panel and extend from the front surface. Each of the support bars comprises a linear bottle supporting portion that is positioned, and that is at an acute angle, relative to the front surface such that at least two of the support bars can support a bottle while forcing the bottle against the front surface.

The linear bottle supporting portion may abut the panel.

The linear bottle supporting portion may be spaced from the panel.

The bottle may be a wine bottle and the at least two of the support bars may be offset from each other such that one of the at least two of the support bars is positioned to support the body of the bottle and the other of the at least two of the support bars is positioned to support the neck of the bottle such that when the rack is mounted, the longitudinal axis of the bottle is approximately level.

At least one of the support bars may comprise a panel end and the panel may comprise a support bar groove that frictionally retains the panel end of the at least one of the support bars.

The panel end may form a non-interlocking joint with the sides of the groove.

The groove may comprise a cross-section, when viewed along the length of the groove, that is a right trapezoid.

The linear bottle supporting portion may abut the panel and the side of the right trapezoid not adjacent a right angle of the trapezoid at an angle corresponding to the acute angle.

The linear bottle supporting portion may be spaced from the panel and the panel end may be shaped such that a portion of the support bar abutting the panel is approximately perpendicular relative to the panel.

At least one of the support bars may comprise a panel end and the panel may comprise a support bar groove. The panel end may form an interlocking joint with the groove.

The panel end may form a dovetail joint with the sides of the groove and the panel end may comprise the tail of the dovetail joint.

The linear bottle supporting portion may abut the panel and a bottle supporting side of the panel end or a bottom side of the panel end may be linear and aligned with the bottle supporting portion.

The linear bottle supporting portion may be spaced from the panel and the panel end may be shaped such that a portion of the support bar abutting the panel is approximately perpendicular relative to the panel.

At least one of the support bars may comprise a panel end, the panel may comprise a support bar slot shaped to frictionally retain the panel end of the at least one of the support bars, and the at least one of the support bars may be positioned in the support bar slot.

The support bar slot may extend from the front surface through to the back surface.

The panel end may form a non-interlocking joint with the interior of the panel.

The panel end may comprise a tongue that extends from a body of the at least one support bar and a portion of at least one side of the support bar may be absent to form the tongue.

The at least one support bar may comprise a bottle side that faces the bottle when supporting the bottle, and a portion of the at least one support bar may be absent from the bottle side to form the tongue.

The at least one support bar may comprise a flat bottle side that faces the bottle when supporting the bottle, a flat bottom side that is opposite the bottle side, and rounded left and right sides located between the bottle and bottom sides, and portions of the left and right sides may be absent to form the tongue.

The tongue may have a square or rectangular cross-section.

The support bar slot may be shaped to receive the tongue and not the body of the at least one support bar, and the body of the at least one support bar may abut the front surface.

The panel end may be linear and aligned with the linear bottle supporting portion.

The panel end may be linear and non-aligned with the linear bottle supporting portion.

The panel end may extend perpendicularly relative to the front surface.

One or both of the panel end or the support bar body may comprise a fastener bore extending longitudinally along the at least one support bar and the rack may further comprise a support bar fastener and washer. The support bar fastener may extend through the washer and into the fastener bore of the at least one support bar such that the washer is compressed against the back surface.

The washer may have a back surface through which the fastener extends and the back surface may be tapered such that the fastener bore extends perpendicularly relative to the back surface of the washer.

The linear bottle supporting portion may be at least 7 inches long.

The rack may further comprise wine bottles. Each of the wine bottles may be up to a 750 mL wine bottle having a body diameter of up to 3½ inches and at least two of the wine bottles may be supported using one pair of the support bars.

According to another aspect, there is provided a bottle rack comprising a panel and support bars. The panel comprises a front surface. The support bars are cantilevered from and extend approximately perpendicularly from the front surface. At least one of the support bars comprises a panel end and the panel comprises a support bar groove. The panel end forms an interlocking joint with the groove. The support bars are suitable to support bottles therebetween from the panel to ends of the support bars spaced from the panel such that the longitudinal axis of each of the bottles is approximately parallel to the support bars.

The support bars may comprise bottle supporting portions used to support the bottles. The bottle supporting portions may or may not be linear, and may or may not comprise the entirety of the support bars that protrude from the panel. The bottle supporting portions may abut the panel or be spaced from the panel.

The bottle may be a wine bottle and the at least two of the support bars may be offset from each other such that one of the at least two of the support bars is positioned to support the body of the bottle and the other of the at least two of the support bars is positioned to support the neck of the bottle such that when the rack is mounted, the longitudinal axis of the bottle is approximately level.

The support bar groove may frictionally retain the panel end of the at least one of the support bars.

The groove may comprise a cross-section, when viewed along the length of the groove, that is a right trapezoid.

The bottle supporting portion may abut the panel and the side of the right trapezoid not adjacent a right angle of the trapezoid at an angle corresponding to the acute angle.

The bottle supporting portion may be spaced from the panel and the panel end may be shaped such that a portion of the support bar abutting the panel is approximately perpendicular relative to the panel.

The panel end may form a dovetail joint with the sides of the groove and the panel end may comprise the tail of the dovetail joint.

The bottle supporting portion may abut the panel and a bottle supporting side of the panel end or a bottom side of the panel end may be linear and aligned with the bottle supporting portion.

At least one of the support bars may comprise a panel end, the panel may comprise a support bar slot shaped to frictionally retain the panel end of the at least one of the support bars, and the at least one of the support bars may be positioned in the support bar slot. The support bar slot may extend from the front surface through to the back surface. The panel end when inserted into one of the slots may form a non-interlocking joint with the interior of the panel.

The panel end may comprise a tongue that extends from a body of the at least one support bar and a portion of at least one side of the support bar may be absent to form the tongue.

The at least one support bar may comprise a bottle side that faces the bottle when supporting the bottle, and a portion of the at least one support bar may be absent from the bottle side to form the tongue.

The at least one support bar may comprise a flat bottle side that faces the bottle when supporting the bottle, a flat bottom side that is opposite the bottle side, and rounded left and right sides located between the bottle and bottom sides, and portions of the left and right sides may be absent to form the tongue.

The tongue may have a square or rectangular cross-section.

The support bar slot may be shaped to receive the tongue and not the body of the at least one support bar, and the body of the at least one support bar may abut the front surface.

The panel end may extend perpendicularly relative to the front surface.

One or both of the panel end and the support bar body may comprise a fastener bore extending longitudinally along the at least one support bar and the rack may further comprise a support bar fastener and washer. The support bar fastener may extends through the washer and into the fastener bore of the at least one support bar such that the washer is compressed against the back surface.

The washer may have a back surface through which the fastener extends and the back surface may be tapered such that the fastener bore extends perpendicularly relative to the back surface of the washer.

The rack may further comprise wine bottles. Each of the wine bottles may be up to a 750 mL wine bottle having a body diameter of up to 3½ inches and at least two of the wine bottles may be supported using one pair of the support bars.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

One example of a "label forward" bottle rack is a rack in which support bars are attached to and extend perpendicularly from a wall. The support bars comprise recessed portions sized to receive a predetermined type of wine bottle. The longitudinal axes of the bottles stored on the wine rack extend parallel to the wall such that the bottles' labels are outwardly facing and are level relative to the floor.

This conventional type of label forward bottle rack suffers from several problems. For example, the recessed portions on the support bars are sized to fit only a predetermined type of wine bottle. Should a user wish to store a different type of wine bottle that is differently sized, the user may need to replace the rack's existing support bars with new support bars having differently sized recessed portions. Further, if the support bars are used to store multiple bottles, bottles stored farther from the wall may completely obstruct the user's view of the labels of bottles stored on the same support bars nearer to the wall. Another issue with conventional label forward bottle racks is that using perpendicularly extending support bars is relatively space inefficient, particularly since only the recessed portions of those bars are used to directly support the bottles; space is wasted by virtue of the fact that the bottles are not stacked on each other and that non-recessed portions of the support bars are not used to support bottles. Additionally, the curved recessed portions of the support bars used in conventional label forward wine racks make transporting them relatively awkward and inefficient given the amount of volume they require for shipping.

Various embodiments described herein address at least some of these issues. The depicted embodiments comprise a panel comprising a front surface and an opposing back surface, and support bars cantilevered from the panel that extend from the front surface. Each of the support bars comprises a linear bottle supporting portion that is positioned, and that is at an acute angle, relative to the panel's front surface such that at least two of the support bars can support a bottle while forcing the bottle against the panel's front surface. In the depicted embodiments, the entire portion of the support bars extending from the panel is linear. This permits relatively space efficient wine storage and rack transport. Furthermore, when the same support bars are used to store multiple bottles, those bottles are stacked on each other because the support bars are positioned at an angle. This permits the labels of all of the bottles stored using the depicted racks to always at least be partially visible to a typical user.

Figure 1A:
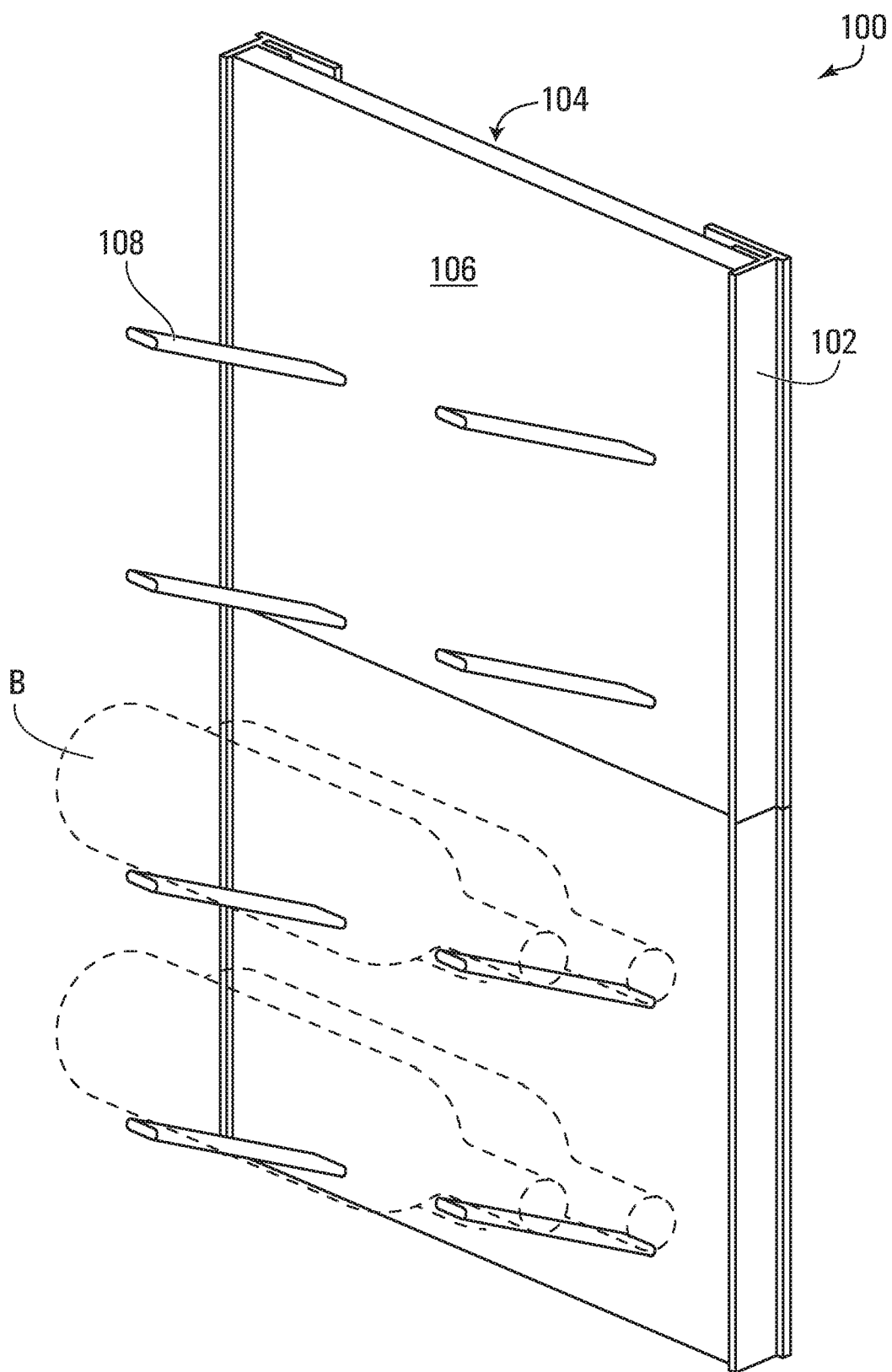
FIGS. 1A-1C are perspective, right side elevation, and front elevation views of a bottle rack, according to first and second embodiments.
Figure 1B:
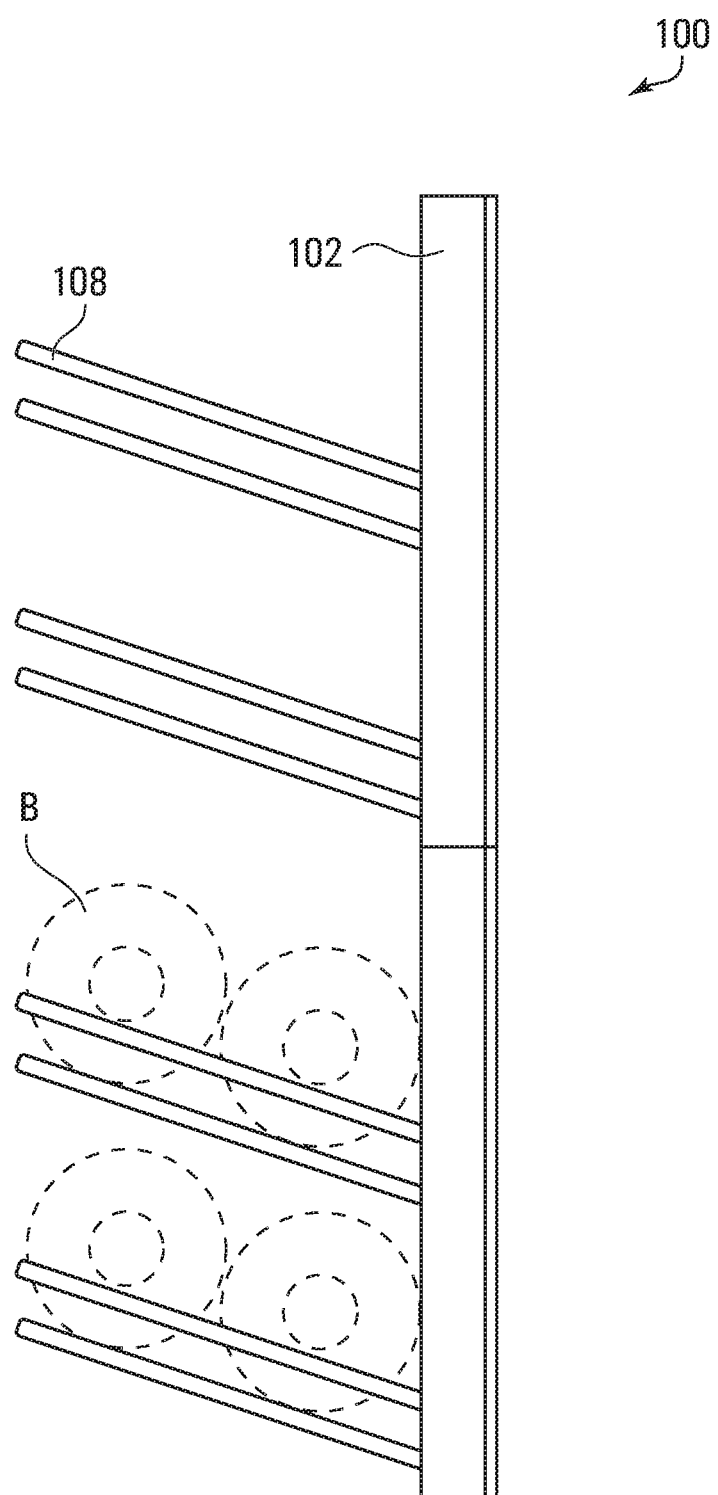
Figure 1C:
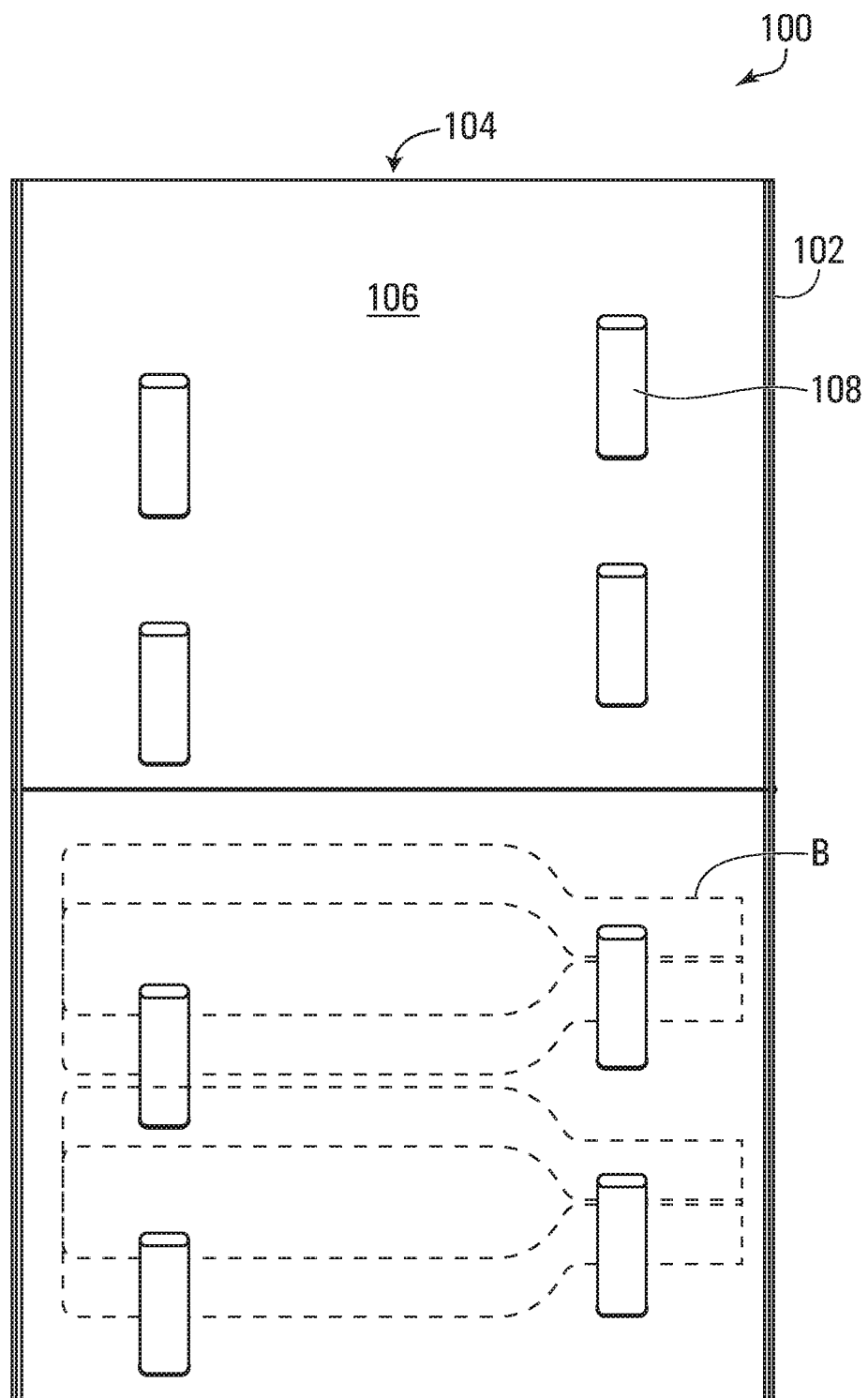

Referring now to FIGS. 1A-1C, there are shown perspective, right side elevation, and front elevation views of a bottle rack 100 according to first and second embodiments. The rack 100 comprises a panel 104 that is rectangular and that has on its left and right sides mounting brackets 102 configured to mount the rack 100 to a mounting surface, such as a wall. An example type of bracket 102 that may be used is any one of the brackets 102 described in U.S. Pat. No. 9,149,115, the entirety of which is hereby incorporated by reference. The rack 100 also comprises support bars 108 that are cantilevered from the panel 104 and that comprise a linear bottle supporting portion 112 (not labeled in FIGS. 1A-1C, but labeled in FIGS. 3A, 3B, 6A, and 6B) that are inclined to form an acute angle with the panel's 104 front surface 106. A first bottle B placed in this acute angle rolls towards the front surface 106 and is pressed against the front surface 106 by the support bars 108 and, more particularly, by the bottle supporting portions 112. Subsequent bottles B stored on the same support bars 108 roll towards and rest against bottles B already resting on those bars 108 and are indirectly pressed against the front surface 106.

In the depicted embodiments, the linear bottle supporting portion 112 comprises approximately all of the exposed portion of the support bar 108 when the rack 100 is assembled, and the bottle supporting portion 112 abuts against the front surface 106 of the rack 100. As discussed in further detail below, in different embodiments the exposed portions of the support bars 108 may comprise portions that exclude the linear bottle supporting portions 112.

The depicted embodiments of the rack 100 are for storing wine bottles in particular. Consequently, at least two of the support bars 108 are offset from each other such that one of the at least two of the support bars 108 is positioned to support the bodies of the bottles B and the other of the at least two of the support bars 108 is positioned to support the necks of the bottles B. As shown in the depicted embodiments, the support bars 108 may be offset such that when the rack 100 is mounted to the wall, the longitudinal axes of the bottles B are approximately level. In different embodiments and in particular when the rack 100 is not designed for wine bottles, pairs of the support bars 108 may be differently offset from each other or not offset from each other at all. For example, in one non-depicted embodiment the support bars 108 may be offset such that the longitudinal axes of the bottles B, and accordingly the necks of the bottles B, are angled downwards.

Figure 2:
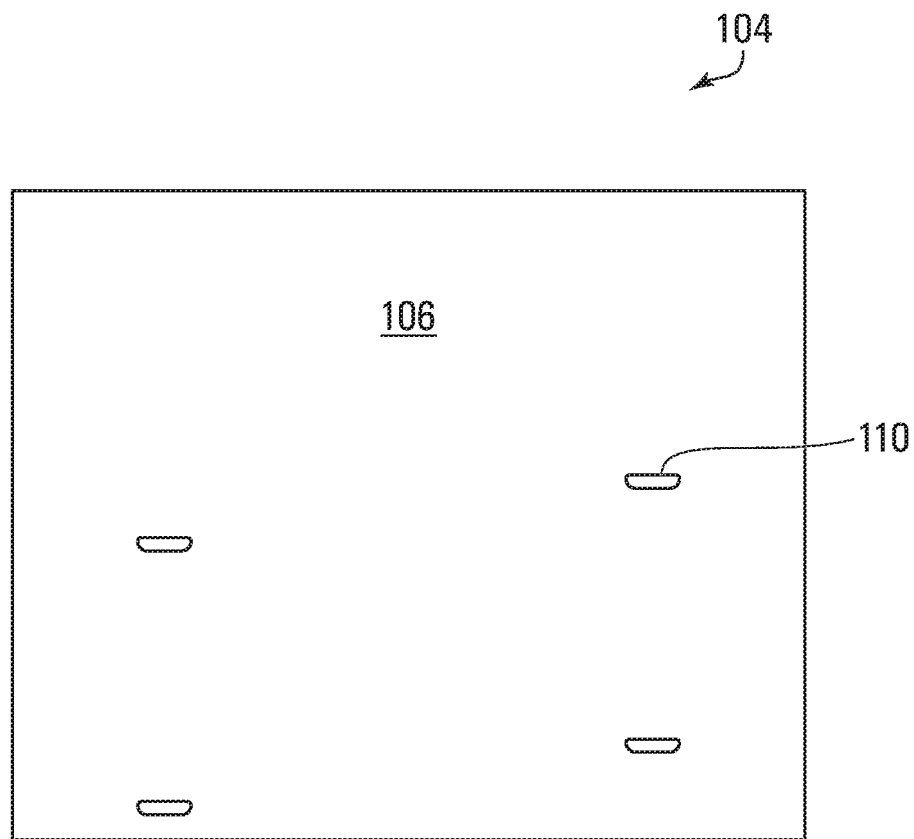
FIG. 2 is a front elevation view of a panel comprising part of the bottle rack of the first embodiment.
Figure 3A:
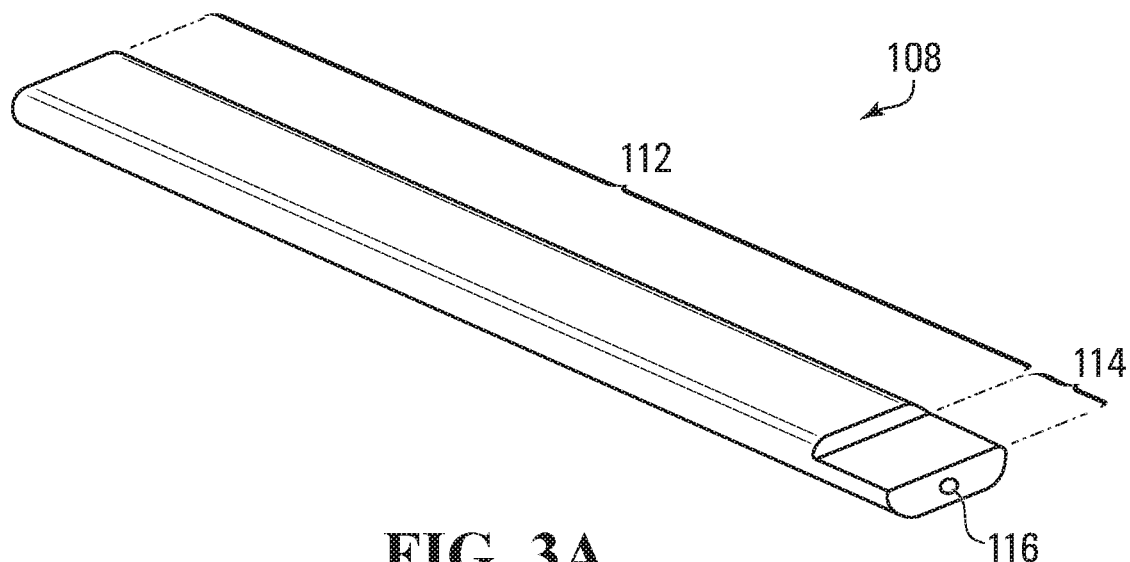
FIGS. 3A and 3B are perspective and right side elevation views of a support bar comprising part of the bottle rack of the first embodiment.
Figure 3B:
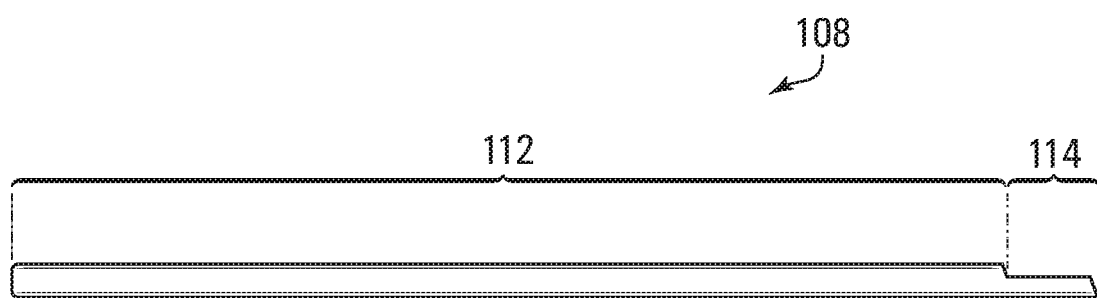
Figure 4:
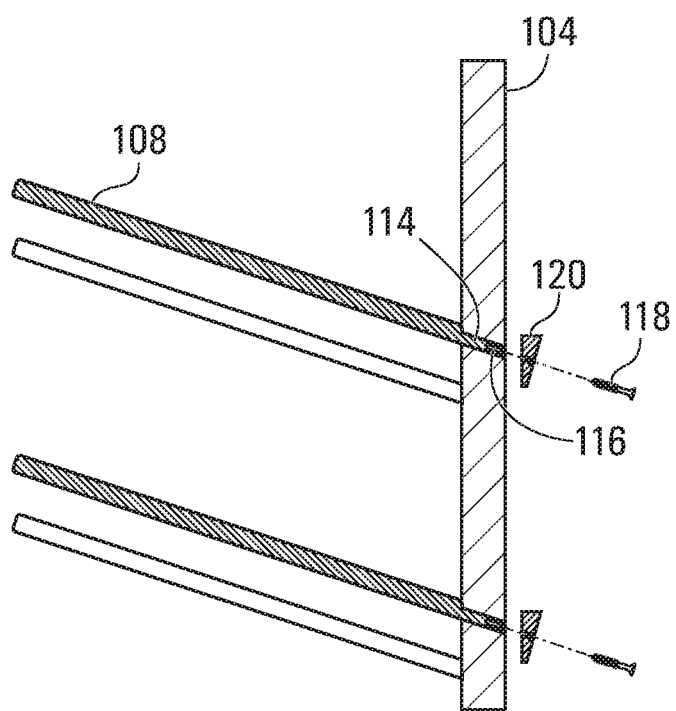
FIG. 4 is a sectional view of the bottle rack of the first embodiment showing a section of the panel of FIG. 2 and a pair of the support bars of FIGS. 3A and 3B.

FIGS. 2-4 are directed at the first embodiment of the rack 100. More particularly, FIG. 2 shows a front elevation view of the panel 104 in isolation, FIGS. 3A and 3B show perspective and side elevation views of the support bar 108, and FIG. 4 shows a sectional view of the rack 100. Each of the support bars 108 of the first embodiment comprises a panel end 114, and the panel 104 comprises support bar slots 110 each shaped to frictionally retain the panel end 114 of one of the support bars 108.

Figure 12:
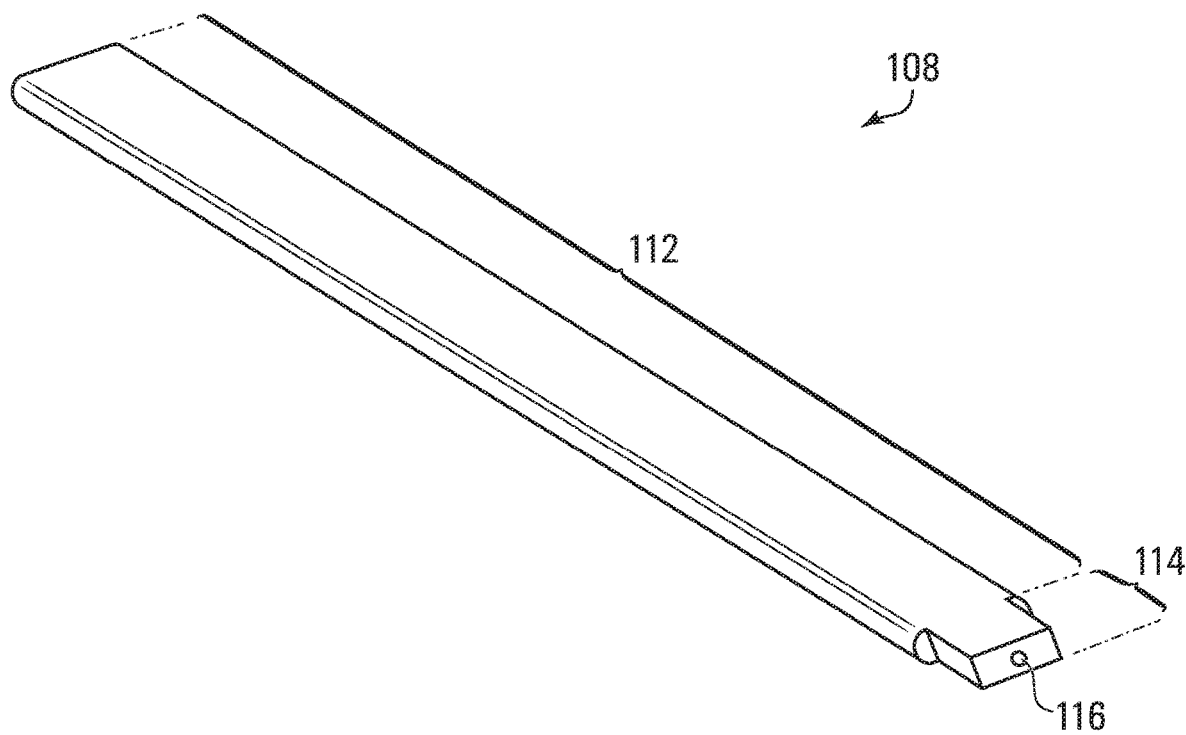
FIG. 12 is a perspective view of a support bar comprising part of the bottle rack of a seventh embodiment.

In the first embodiment, each of the support bars 108 comprises the panel end 114 and the linear bottle supporting portion 112. The panel end 114 comprises a tongue that extends from a body of the support bar 108, which in the depicted embodiment corresponds to the bottle supporting portion 112. Each of the support bars 108 comprises a bottle side that faces the bottle B when supporting the bottle B, and a portion of the support bar 108 is absent from the bottle side to form the tongue. This portion of the support bar 108 may be removed through machining. In a non-depicted embodiment, a different portion of the support bar 108 may be absent; for example, one or more portions of the support bar 108 may be missing from any one or more of the bottle side, the side opposite the bottle side (the "bottom side"), or one or both of the sides between the bottle and bottom sides ("left and right sides"). For example, FIG. 12 depicts an embodiment in which the left and right sides are removed such that the tongue has a rectangular cross-section. In a non-depicted embodiment, the tongue may have a square cross-section, or a cross-section of any other suitable shape formed by removing portions of any one or more of the top, bottom, left, and right sides of the panel end 114. Each of the slots 110 has a constant cross-section that is approximately identical to the cross-section of the tongue and is thereby shaped to receive and frictionally retain the tongue. The support bar slot 110 extends through the entire panel 104 (i.e., from the front surface 106 to the back surface), and the tongue extends through approximately the entire slot 110 and approximately fills the slot 110.

As the support bar slots 110 have a smaller cross-section than the body of the support bar 108, which in the depicted embodiment corresponds to the bottle supporting portion 112, the slots 110 do not receive the bottle supporting portions 112. Instead, the bottle supporting portions 112 abut against the front surface 106.

A back surface of the panel end 114 of each of the support bars 108 comprises a fastener bore 116 extending longitudinally along the support bar 108. In different embodiments (not depicted), the support bar 108 may additionally or alternatively comprise a fastener bore 116 in the body of the support bar 108 so that the fastener 118 is directly inserted into the body. The tongue may comprise another of the bores 116 or may lack the bore 116. The rack 100 also comprises support bar fasteners 118 and washers 120. Each of the fasteners 118 extends through one of the washers 120 and into the fastener bore 116 of one of the support bars 108 such that the washer 120 is compressed against the panel's 104 back surface. For example, in embodiments in which the fastener 118 is a screw, the screw may be screwed into the bore 116 until the washer 120 is compressed and the bar 108 is thereby secured.

As shown in FIG. 4, the washer 120 in FIG. 4 has a back surface opposite the surface of the washer 120 that abuts against the panel's 104 back surface and through which the fastener 118 extends that is tapered such that the fastener bore 116 extends perpendicularly relative to the back surface of the washer 120. This has the effect of increasing the amount of the washer 120 the fastener 118 extends through and of making the back surface of the washer 120 perpendicular to the fastener 118, thereby facilitating insertion of the fastener 118 into the bore 116. In a non-depicted embodiment, the washer 120 may be tapered differently, or may not be tapered at all.

While one embodiment of the fastener 118 is described as a screw above, different types of fasteners (e.g., a nail) may be used. Furthermore, one or more of the fasteners 118 may be used to secure a single one of the support bars 108 to the panel 104.

In the first embodiment, the panel end 114 of each of the support bars 108 is linear and aligned with the linear bottle supporting portion 112. In an embodiment in which the bar 108 comprises only the panel end 114 and the bottle supporting portion 112, this means the entire bar 108 is linear.

Figure 5:
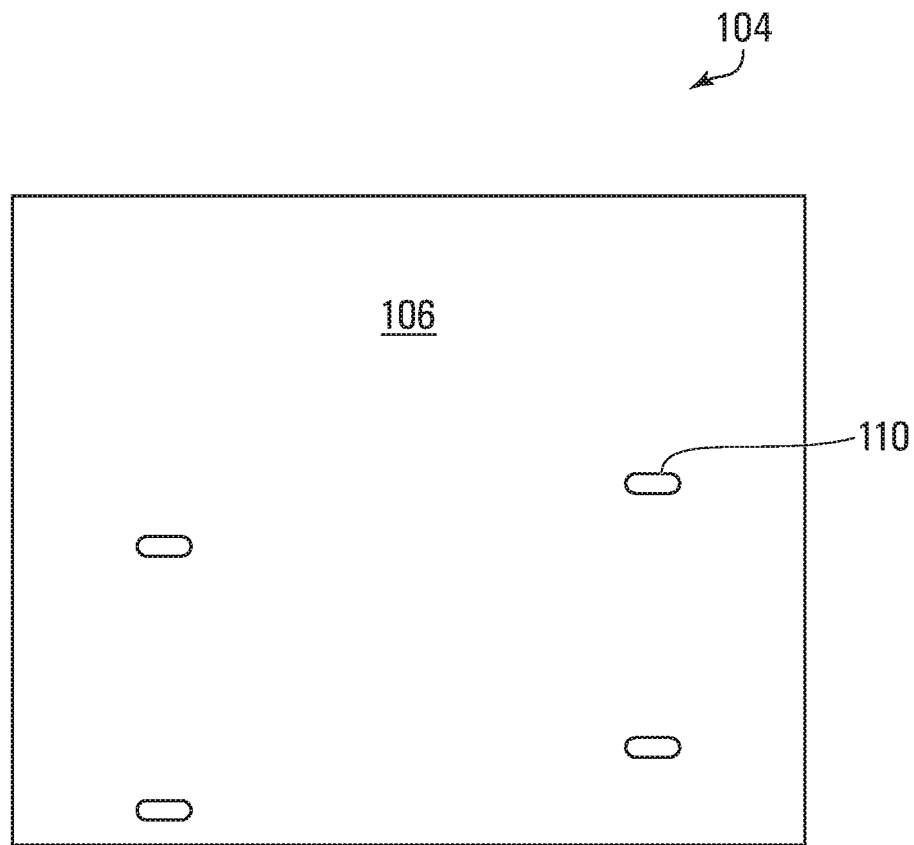
FIG. 5 is a front elevation view of a panel comprising part of the bottle rack of the second embodiment.
Figure 6A:
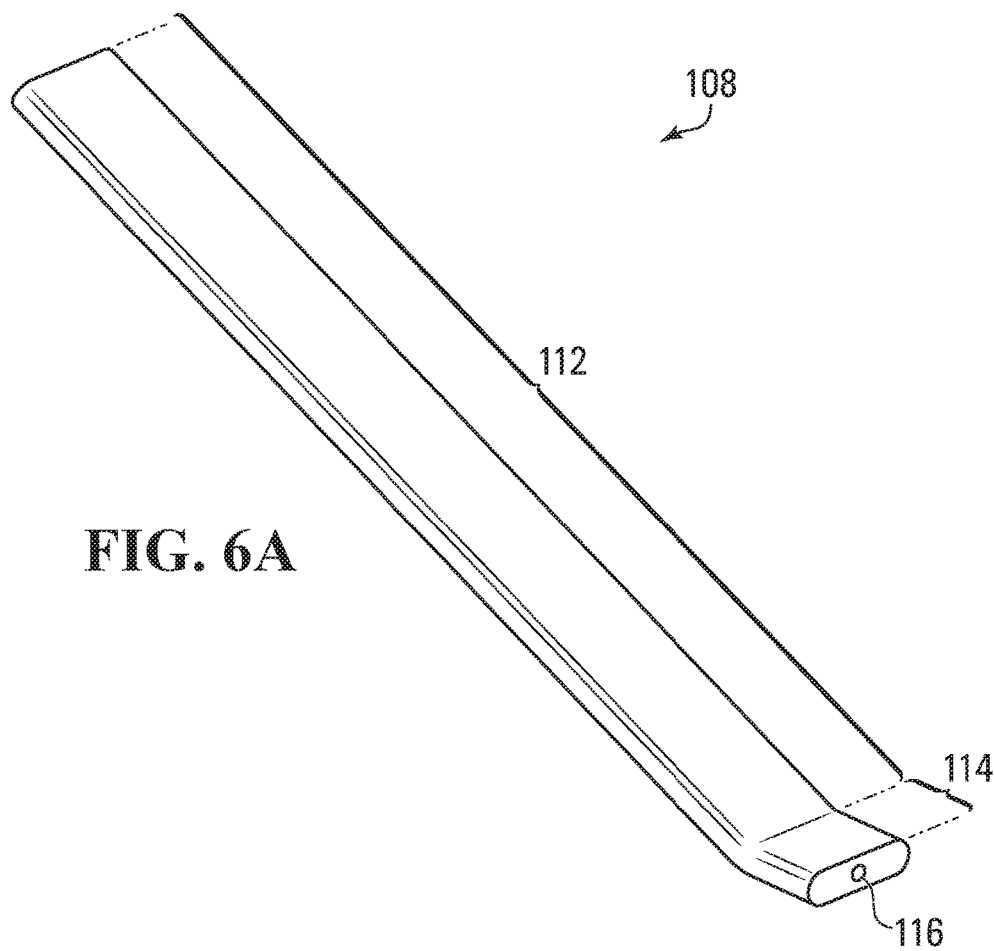
FIGS. 6A and 6B are perspective and right side elevation views of a support bar comprising part of the bottle rack of the second embodiment.
Figure 6B:
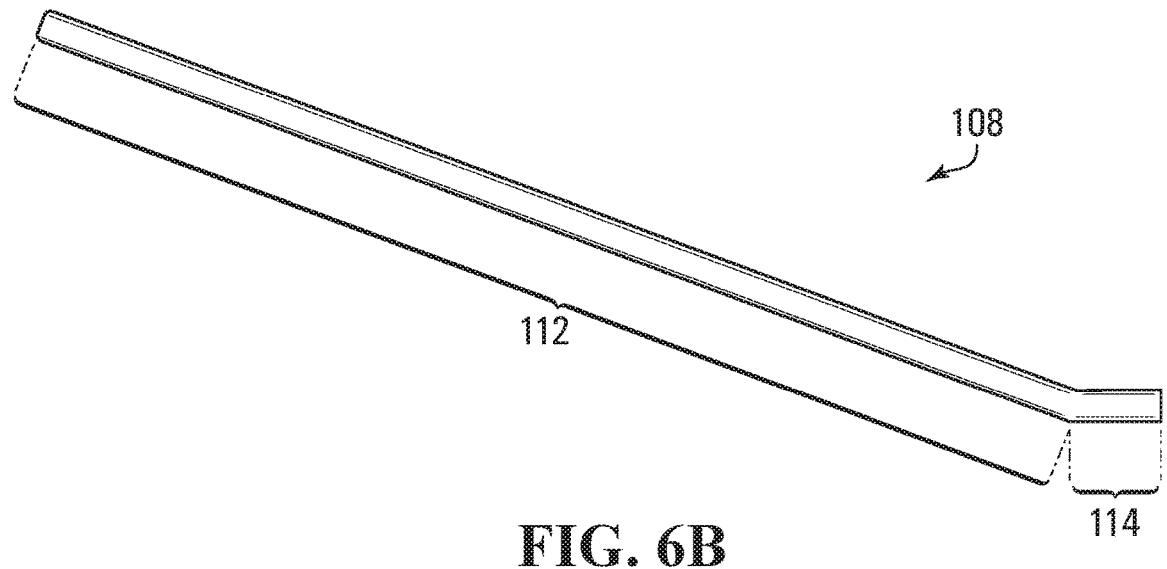
Figure 7:
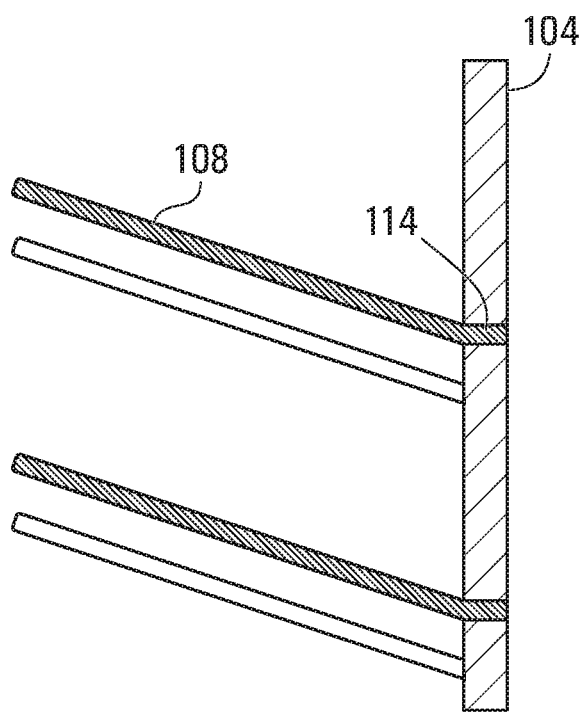
FIG. 7 is a sectional view of the bottle rack of the second embodiment showing a section of the panel of FIG. 5 and a pair of the support bars of FIGS. 6A and 6B.

Referring now to FIGS. 5-7, there is shown the second embodiment of the rack 100. More particularly, FIG. 5 shows a front elevation view of the panel 104 in isolation, FIGS. 6A and 6B show perspective and side elevation views of the support bar 108, and FIG. 7 shows a sectional view of the rack 100. Each of the support bars 108 of the second embodiment comprises a panel end 114, and the panel 104 comprises support bar slots 110 each shaped to frictionally retain the panel end 114 of one of the support bars 108.

In the second embodiment, each of the support bars 108 comprises the panel end 114 and the linear bottle supporting portion 112. However, unlike in the first embodiment the bottle supporting portion 112 and the panel end 114 have identical cross sections. The support bar 108 is bent at the junction between the bottle supporting portion 112 and the panel end 114 and consequently the panel end 114 of each of the support bars 108 is linear and is non-aligned with the linear bottle supporting portion 112.

The panel 104 comprises support bar slots 104, each of which has a cross-sectional area approximately identical to the cross-section of the panel end 114 and is thereby shaped to receive and frictionally retain one of the panel ends 114. In the depicted embodiment the support bar slot 110 extends through the entire panel 104 (i.e., from the front surface 106 to the back surface), and the slot 110 extends perpendicularly to the front surface 106. As discussed in further detail below, in another embodiment the support bar slot 110 need not extend through the entire panel 104. The panel ends 114 of the bars 108 have lengths corresponding to the thickness of the panel 104 so that the bar 108 does not protrude past the back surface of the panel 104. An adhesive may be used to help secure the bars 108 in the panel 104. Alternatively, the fasteners 118 may be used to secure the bars 108 in a manner similar to the first embodiment.

Referring now to FIGS. 8-11, there are shown third through sixth embodiments of the rack 100. As in the embodiment of FIG. 1, in FIG. 8 the rack 100 comprises the panel 104, support bars 108, and brackets 102 used to mount the rack 100 to a wall. In contrast to FIG. 1, each of the support bars 108 is inserted into one of four grooves 122 instead of one of the slots 110. As discussed in respect of FIGS. 9 and 10, the structure of the grooves 122 may vary with different embodiments of the rack 100. Also, as described in respect of FIG. 11 below, depending on the embodiment the bars 108 may be inserted into the grooves 122 from the front of the panel 104 (i.e., entering the groove 122 by crossing the front surface 106) or by being slid into the grooves 122 from the sides of the panel 104. While the rack 100 of FIG. 8 comprises four of the grooves 122, in different embodiments (not depicted) the panel 104 may comprise a different number of the grooves 122 that may be used in combination with the slots 110 or another mechanism for retaining the bars 108. For example, the panel 104 may comprise grooves 122 to retain the support bars 108 that support bottle bodies and slots 110 to retain the support bars 108 that support bottle necks.

Figure 8:
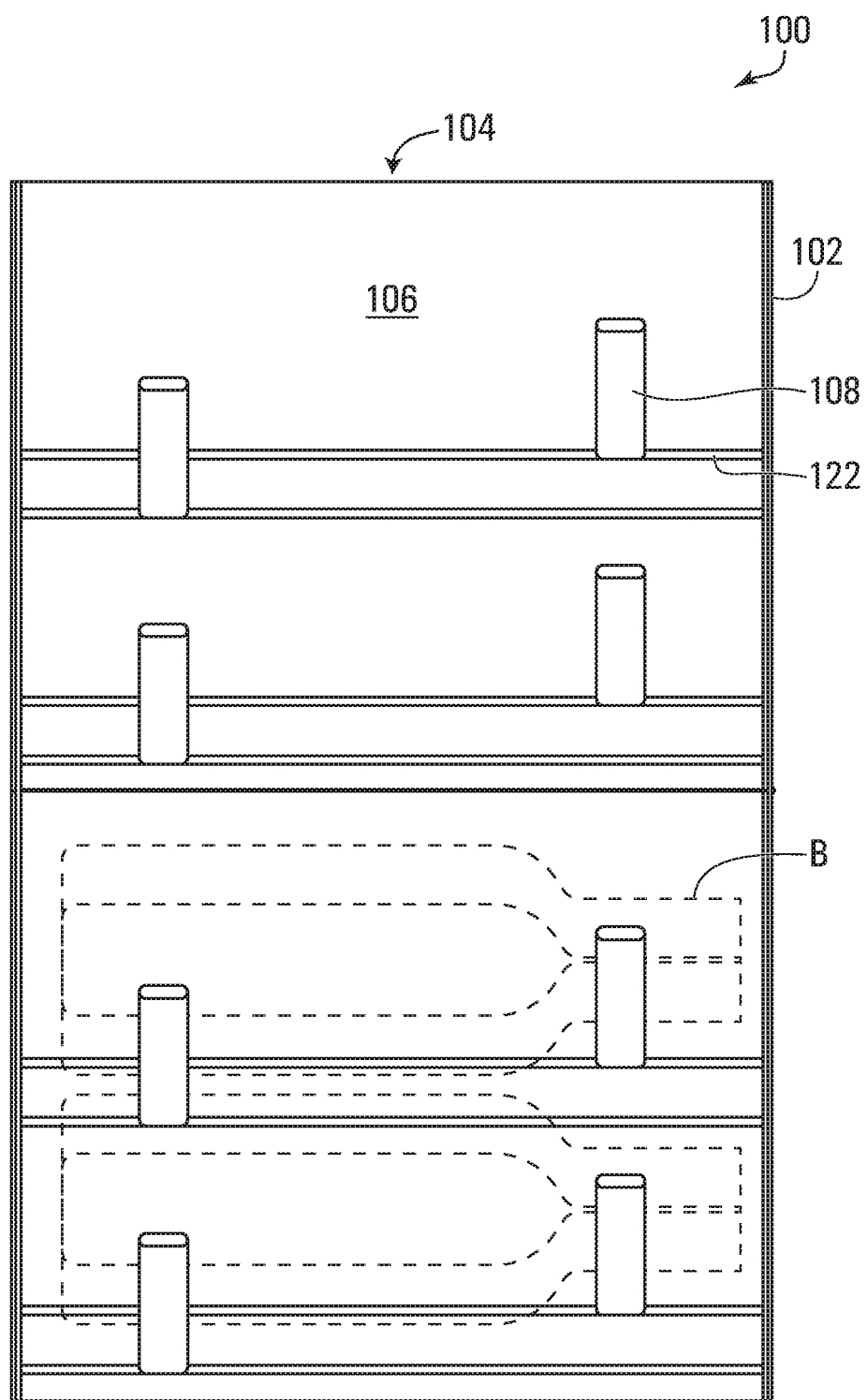
FIG. 8 is a front elevation view of the bottle rack according to a third embodiment.
Figure 9:
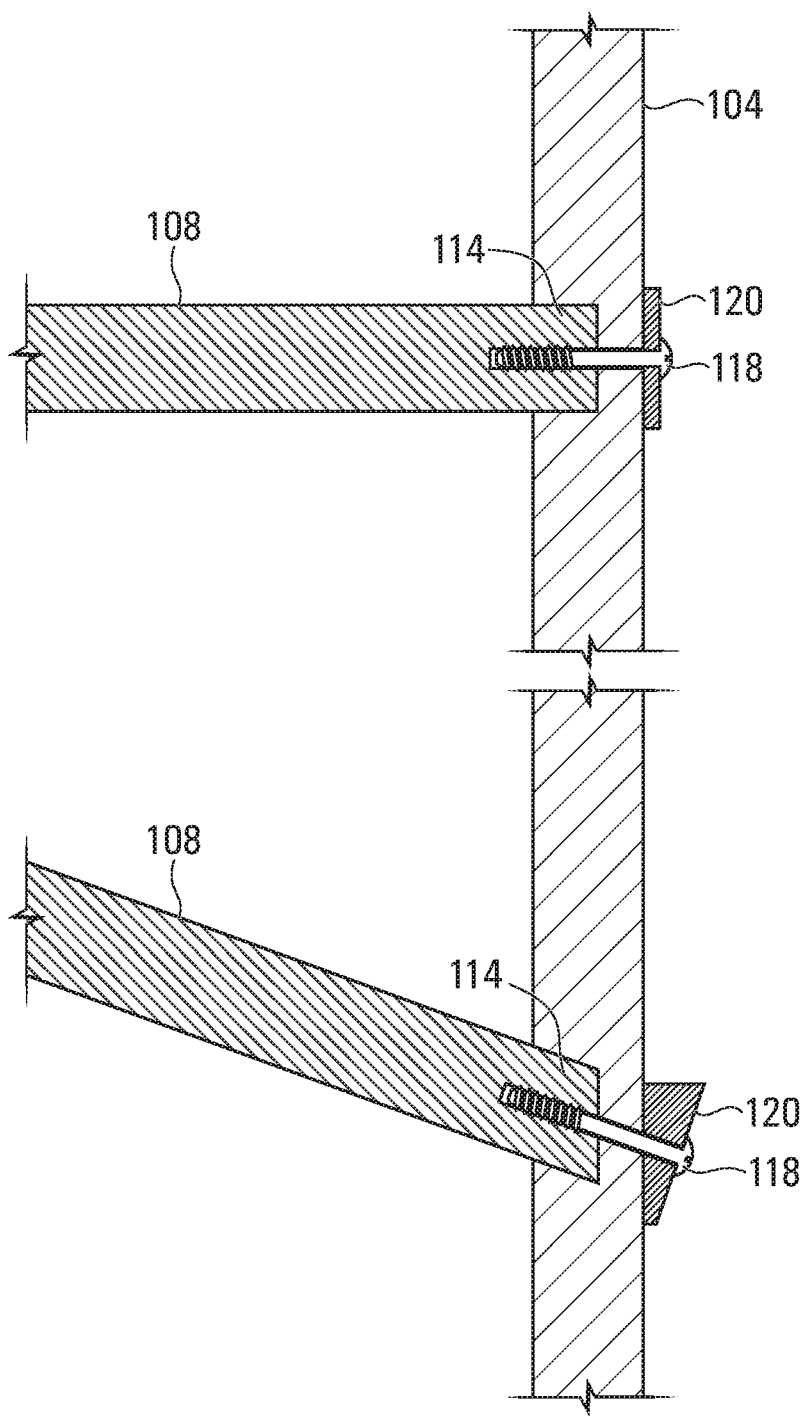
FIGS. 9-11 are sectional views of the bottle rack according to fourth through sixth embodiments.

In FIG. 9, there is shown a sectional view of a fourth embodiment of the rack 100 in which portions of some of the support bars 108 that abut the front surface 106 extend perpendicularly from the panel 104, an example of which is depicted as the higher bar 108 in FIG. 9, and in which portions of some of the support bars 108 that abut the front surface 106 are inclined relative to the panel 104, also as depicted in FIG. 8 and an example of which is shown as the lower bar 108 in FIG. 9. The groove 122 is shaped to frictionally retain the panel end 114 of the top bar 108. That is, the groove 122 has a height that is approximately equal to the height of the panel end 114, thereby facilitating a frictional fit between the bar 108 and the panel 104. The panel end 114 of the higher bar 108 comprises the bore 116 and receives the fastener 118, which compresses the washer 120 against the back side of the panel 104 as described in respect of FIG. 4.

The groove 122 used to retain the lower bar 108 in FIG. 9 is angled at the acute angle that the lower bar 108 makes with respect to the panel's 104 front surface 106 and is similarly sized to frictionally retain the panel end 114 of the lower bar 108. The panel end 114 of the higher bar 108 comprises the bore 116 and receives the fastener 118, which compresses the washer 120 against the back side of the panel 104 as described in respect of FIG. 4. As the lower bar 108 is angled, the back side of the washer 120 is tapered as it is in FIG. 4.

While the grooves 122 are used to retain the bars 108 in the embodiment of FIG. 9, in a different embodiment the slots 110 may be used to retain the bars 108 since the panel ends 114 and grooves 122 are shaped to permit the panel ends 114 to be inserted into the grooves 122 from the front of the panel 104 by crossing from one side of the front surface 106 to the other, as well as slid along the grooves 122 from the panel's 104 sides. In FIG. 9, the panel ends 110 and the grooves 122 collectively form a non-interlocking joint and are secured together using the fastener 118. By "non-interlocking joint", it is meant a joint that, when unsecured by the fastener 118, permits the support bar 108 to be pulled out of the groove 122 by having the panel end 114 cross from behind the front surface 106 to in front of the front surface 106 (i.e., in the depicted embodiment, without having to slide the bar 108 out of the groove 122 via the side of the panel 104).

For each of the support bars 108, the non-interlocking joint formed by the panel end 114 and groove 122 in FIG. 9 is formed by having the panel end 114 abut against the sides of the grooves 122. More specifically, in FIG. 9 the panel end 114 abuts against the top, back, and bottom sides of the groove 122. In different embodiments (not depicted), however, different structures are possible. For example, a portion of the panel ends 114 may abut against the sides of the groove 122 while another portion, such as at least part the panel ends' 114 back surface, may be exposed via the back of the panel 104. In embodiments in which the back surface of the panel end 114 is exposed in this way, that portion may make direct contact with one or both of the head of a screw (when a screw is used as the fastener 118) and the washers 120, as depicted in FIG. 4. As another example, the entire back surface of the panel end 114 may be exposed via the panel's 104 back surface, as shown in FIG. 7. As another example, instead of the panel end 114 contacting all the sides of the groove 122 as shown in FIG. 9, the panel end 114 may contact only some or one of the sides of the groove 122 (e.g., only the back side).

Figure 10:
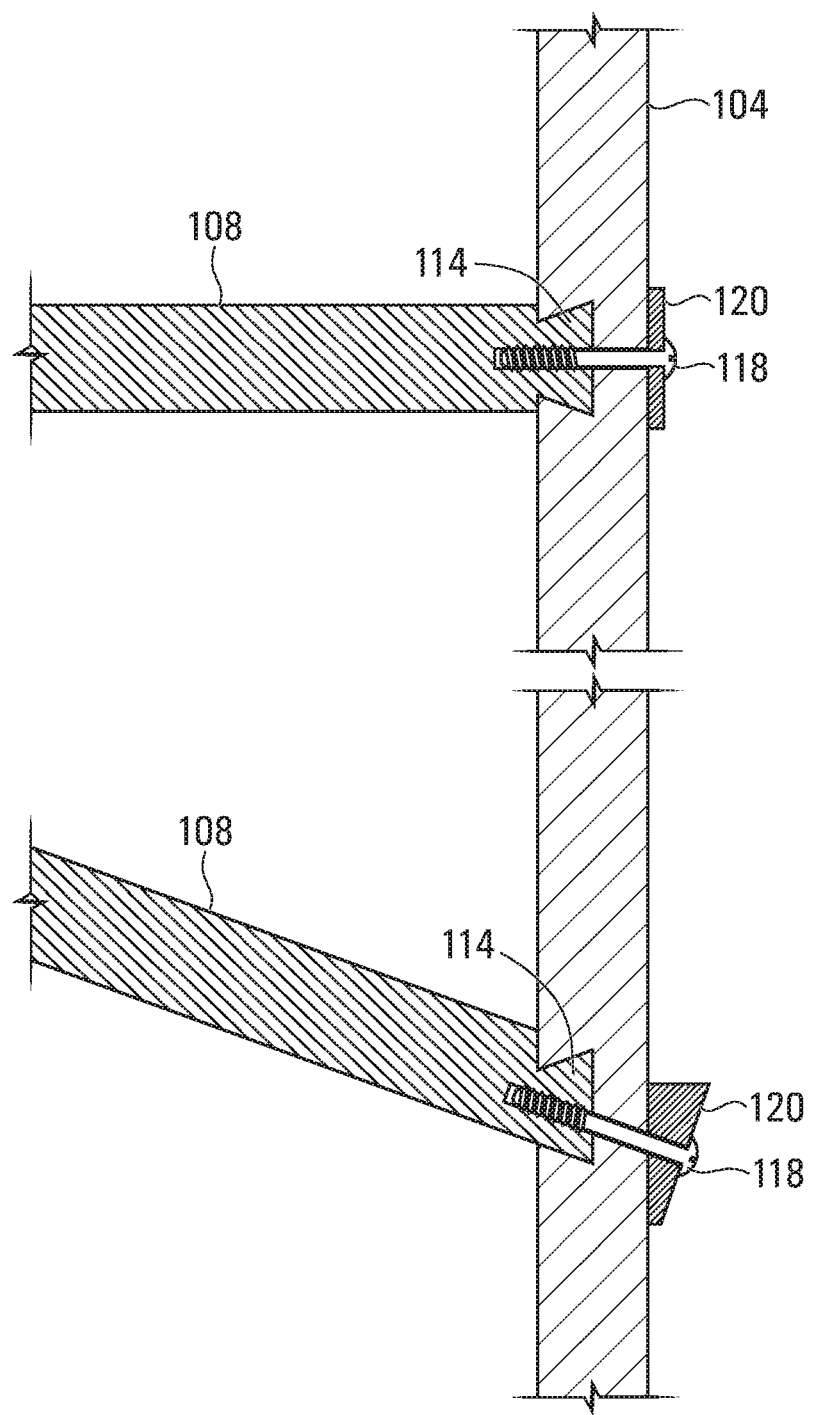

Referring now to FIG. 10, there is shown a sectional view of a fifth embodiment of the rack 100 in which portions of some of the support bars 108 that abut the front surface 106 extend perpendicularly from the panel 104, an example of which is depicted as the higher bar 108 in FIG. 10, and in which portions of some of the support bars 108 that abut the front surface 106 are inclined relative to the panel 104, also as depicted in FIG. 8 and an example of which is shown as the lower bar 108 in FIG. 10. In contrast with the embodiment of FIG. 9, the joints used in FIG. 10 are shaped such that the panel ends 114 need to be slid along the grooves 122 to the their proper location on the panel 104 as opposed to inserted into the grooves 122 as is possible in FIG. 9. While any suitable interlocking joint may be used, the embodiment of FIG. 10 uses a type of dovetail joint. The grooves 122 are identically shaped for both the higher and lower bars 108. However, the panel ends 114, comprising the tails of the dovetail joints, of the higher and lower bars 108 are differently shaped. For the higher bar 108, the panel end 114 is symmetrical and shaped so that the portion of the bar 108 that abuts against the front surface 106 projects perpendicularly from the front surface 106. For the lower bar 108, the panel end 114 is asymmetrical. More particularly, the bottle side of the panel end 114 is identical to the bottle side of the panel end 114 of the higher bar 108, but the bottom side of the panel end 114 is linear. The angle of the intersection between the tail and socket of the dovetail joint of the lower bar 108 relative to the panel surface 106 corresponds to the acute angle at which the lower bar 108 is inclined relative to the surface 106.

In certain embodiments that use an interlocking joint such as the dovetail joint of FIG. 10, the interlocking joint permits the panel 104 and support bars 112 to support the bottles B without using the fasteners 118. Accordingly, in those embodiments the risk of the bottles B falling and breaking due to the fasteners 118 failing is reduced. Additionally, since the fasteners 118 are not required for substantial load bearing in those embodiments, the support bars 108 may be made thinner relative to embodiments in which the fasteners 118 are used for load bearing, because the diameter of the fastener bore 116 may be made thinner than in embodiments in which the fasteners 118 are required to bear load. This may result in a significant savings of materials and weight for the support bars 112.

Additionally, in certain embodiments that use an interlocking joint such as the dovetail joint of FIG. 10, the panel 104 itself may be made thinner than in embodiments in which the panel 104 is used in combination with non-interlocking joints without the fasteners 118. In embodiments in which the panel 104 is used in combination with non-interlocking joints without the fasteners 118, the panel 104 is made relatively thick to support the bars 108. However, in embodiments comprising the interlocking joint, the panel 104 may be made thinner without compromising the rack's 100 structural integrity. This may result in significant materials and weight savings.

Figure 11:
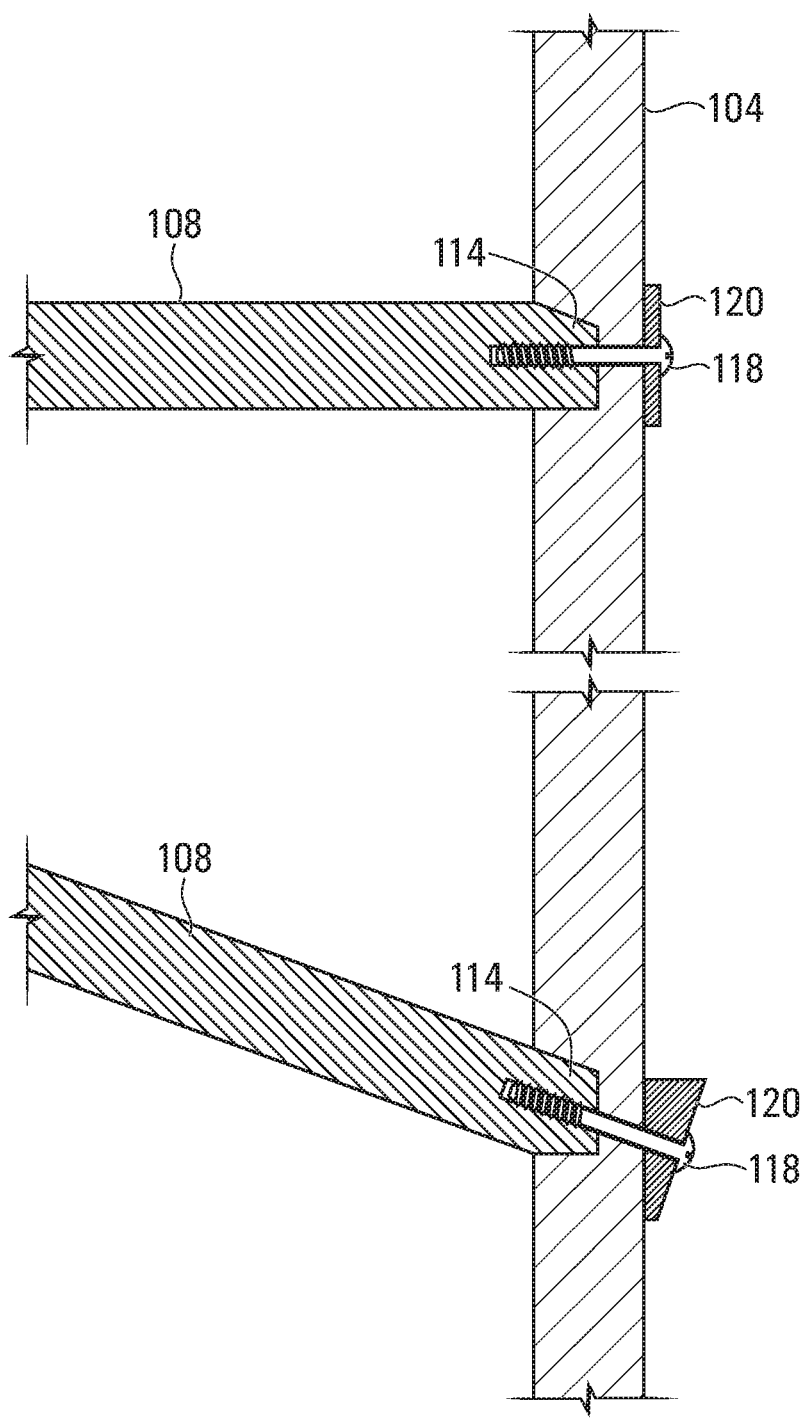

Referring now to FIG. 11, there is shown a sectional view of a sixth embodiment of the rack 100 in which portions of some of the support bars 108 that abut the front surface 106 extend perpendicularly from the panel 104, an example of which is depicted as the higher bar 108 in FIG. 11, and in which portions of some of the support bars 108 that abut the front surface 106 are inclined relative to the panel 104, also as depicted in FIG. 8 and an example of which is shown as the lower bar 108 in FIG. 11. As with FIG. 9, while the grooves 122 are used to retain the bars 108 in FIG. 11, in a different embodiment the slots 110 may be used to retain the bars 108 since the panel ends 114 and grooves 122 are shaped to permit the panel ends 114 to be inserted into the grooves 122 from the front of the panel 104 by crossing from one side of the front surface 106 to the other, as well as inserted into the grooves 122 from the panel's 104 sides and slid to their final positions. In FIG. 11, the panel ends 110 and the grooves 122 collectively form a non-interlocking joint and are secured together using the fastener 118. The grooves 122 have a right trapezoidal cross-section when viewed along their lengths, with the angle of the only side of the trapezoid not adjacent a right angle corresponding to the angle that the lower bar 108 makes relative to the front surface 104. The bottle side of the lower bar 108 is linear. For the higher bar 108, the bottle side of the panel end 114 has a portion absent from it that permits the portion of the bar 108 abutting the front surface 104 to extend perpendicularly therefrom.

In each of FIGS. 9-11, the inclined bottle supporting portion 112 of the lower bar 108 abuts against the panel's 104 front surface 106, while the inclined bottle supporting portion 112 of the higher bar 108 is spaced from the panel 104. The higher bars 108 in these embodiments comprise another segment between the inclined bottle supporting portion 108 and the panel end 114 that is linear and that perpendicularly extends from the panel 104; in different embodiments (not depicted), this additional segment may be non-linear, may extend non-perpendicularly from the panel 104, or both. In certain embodiments, this additional segment causes the bottle supporting portion 108 to be spaced by less than a diameter of the body of the bottle B for which the rack 100 is designed. Consequently, the bottle supporting portion 112 is still positioned to contact the bottle's B body and press it against the front surface 106 when the bottle B is resting in the acute angle between the bottle supporting portion 112 and the front surface 106, as occurs in the depicted embodiments.

The rack 100 may be sized to hold multiple bottles of various sizes. For example, the support bars 108 may be made sufficiently long to hold one, two, three, or more split bottles (2"-2⅜" body diameter), Bordeaux bottles (2⅞"-3¼" body diameter), Champagne bottles (3½" body diameter), Burgundy bottles (3¼" body diameter), large Pinot bottles (3⅜" body diameter), Turley bottles (3 9/16" body diameter), or magnum bottles (4"-4½" body diameter). For example, to hold at least three magnum bottles, the bottle supporting portions 112 of the depicted embodiments should be at least 12 inches long, and in certain embodiments longer depending on the angle the bottle supporting portions 112 make with the front surface 106. In another embodiment, the support bars 108 are at least 7 inches long.

While certain embodiments are depicted in the figures and certain non-depicted embodiments are described above, additional non-depicted embodiments are possible.

For example, while the panel 104 shown in the depicted embodiments is rectangular, in non-depicted embodiments the panel 104 may be differently shaped. For example, the panel 104 may be shaped as a different type of polygon, such as a square, or may be irregularly shaped. In those embodiments, the brackets 102 may be affixed along portions of the periphery of the panel 104.

As another example, in all of the depicted embodiments comprising the groove 122 or slots 110, the support bars 108 may be fastened to the panel 104 without using the washer 120.

In another non-depicted embodiment, the support bar slots 110 may not extend all the way through the panel 104; that is, the slots 110 may not extend from the front surface 106 to the panel 104's back surface as depicted in FIGS. 4 and 7. Instead, the slots 110 may extend only partially through the panel 104, thereby causing the panel ends 114 of the support bars 108 to abut against the interior of the panel 104. The support bars 108 may be frictionally retained by the panel 104, retained using the fasteners 118 with or without the washers 120, or both. In a related, non-depicted embodiment, the slots 110 may extend through the entire panel 104, but the support bars 108 may not.

The embodiments depicted in FIGS. 2-4 and 9-11 use the washer 120 and fastener 118 to secure the bars 108 to the panel 104, while the embodiment depicted in FIGS. 5-7 uses one or both of a friction fit and an adhesive to secure the bars 108 to the panel 104. However, in non-depicted embodiments, the embodiments of FIGS. 2-4 and 9-11 may use one or both of a friction fit and an adhesive to secure the bars 108, and the embodiment of FIGS. 5-7 may use the fastener 118, the fastener 118 and the washer 120, multiple fasteners 118, or multiple fasteners 118 and one or more washers 120, with one or more bores 116 being machined into the panel ends 114 accordingly.

The various joints used to affix the panel ends 114 to the panel 104 are described in conjunction with support bars 108 that have a linear portion that make an acute angle relative to the panel's 104 front surface 106. However, in different embodiments, any of the joints described herein may be used to affix any type of support bar 108 to any type of panel 104 for any type of bottle rack 100. For example, the joints may be used to affix support bars 108 that do not comprise a linear portion making an acute angle with the front surface 106, such as those described in U.S. Pat. No. 9,149,115.

In embodiments comprising the slots 110, the panel ends 114 need not fill all or approximately all of the bar slots 110. For example, the panel ends 114 may be rectangular or square in cross section as depicted in the embodiment of FIG. 12, while the slots 110 may correspondingly be rectangular or square and further comprise semicircular portions, with one semicircular portion attached to each of the left and right sides of the slots 110 such that the slots 110 have rounded sides. The semicircular portions need not be filled by the panel ends 114.

In another non-depicted embodiment, the support bar 108 body portion and panel end 114 may be two distinct pieces that are releasably couplable to each other or able to be affixed to each other using a screw or other type of fastener. A portion of one of the body portion and panel end 114 may comprise a protrusion and a portion of the other of the body portion and panel end 114 may comprise a correspondingly shaped socket to receive the protrusion. The protrusion and socket may be sized so that the socket frictionally retains the protrusion.

Directional terms such as "top", "bottom", "up", "down", "front", and "back" are used in this disclosure for the purpose of providing relative reference only, and are not intended to suggest any limitations on how any article is to be positioned during use, or to be mounted in an assembly or relative to an environment. The term "affix" and similar terms, and variants of them, as used in this disclosure are intended to include indirect and direct connections unless otherwise indicated. For example, if a first article is affixed to a second article, that affixing may be through a direct connection or through an indirect connection via another article. Additionally, the singular forms "a", "an", and "the" as used in this disclosure are intended to include the plural forms as well, unless the context clearly indicates otherwise. Further, as used herein a first object "abuts" against a second object when the first object borders on or touches the second object.

The word "approximately" as used in this description in conjunction with a number or metric means within 5% of that number or metric.

It is contemplated that any feature of any aspect or embodiment discussed in this specification can be implemented or combined with any feature of any other aspect or embodiment discussed in this specification, except where those features have been explicitly described as mutually exclusive alternatives.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A bottle rack, comprising:
    (a) a panel comprising a front surface and an opposing back surface;
    (b) support bars cantilevered from the panel and extending from the front surface, wherein each of the support bars comprises a respective linear bottle supporting portion that is positioned, and that is at an acute angle, relative to the front surface such that a first support bar and a second support bar of the support bars can support a bottle while forcing the bottle against the front surface;
    (c) wherein the first and second support bars are horizontally and vertically offset from each other such that one of the first and second support bars is positioned to support a body of the bottle and the other of the first and second support bars is positioned to support a neck of the bottle such that, when the rack is mounted, a longitudinal axis of the bottle is approximately level;
    (d) wherein the first and second support bars comprise respective panel ends, wherein the panel comprises a first support bar slot and a second support bar slot shaped to frictionally retain the panel ends of the first and second support bars respectively, wherein the first and second support bars are positioned in the first and second support bar slots respectively, wherein each panel end comprises a respective tongue that extends from a body of each respective support bar and a portion of at least one side of each respective support bar is absent to form each respective tongue, wherein the first and second support bar slots are shaped to receive the respective tongues and not the bodies of the first and second support bars, and the bodies of the first and second support bars abut the front surface of the panel; and
    (e) wherein the panel ends of the first and second support bars each comprise a respective fastener bore extending longitudinally along the first and second support bars respectively, wherein the rack further comprises a first support bar fastener and a second support bar fastener, and wherein the first and second support bar fasteners are configured to extend into respective ones of the fastener bores for fastening the first and second support bars to the panel.

2. The rack of claim 1 wherein each linear bottle supporting portion abuts the panel.

3. The rack of claim 1 wherein each support bar slot extends from the front surface through to the back surface.

4. The rack of claim 1, wherein each of the first and second support bars comprises a flat bottle side that faces the bottle when supporting the bottle, a flat bottom side that is opposite the bottle side, and rounded left and right sides located between the bottle side and the bottom side, and wherein a portion of each left side and each right side is absent to form each respective tongue.

5. The rack of claim 4 wherein each tongue has a square or rectangular cross-section.

6. The rack of claim 1 wherein each linear bottle supporting portion is at least 7 inches long.

7. The rack of claim 1 further comprising wine bottles, wherein each of the wine bottles is up to a 750 mL wine bottle having a body diameter of up to 3½ inches and at least two of the wine bottles are supported using one pair of the support bars.

8. The rack of claim 1, further comprising a first washer and a second washer, wherein the first and second support bar fasteners are further configured to extend through the first and second washers such that the first and second washers are compressed against the back surface of the panel.

* * * * *